April 24, 1945. S. A. NEIDICH 2,374,374
MULTIPLYING MACHINE
Filed Dec. 30, 1939 12 Sheets-Sheet 1
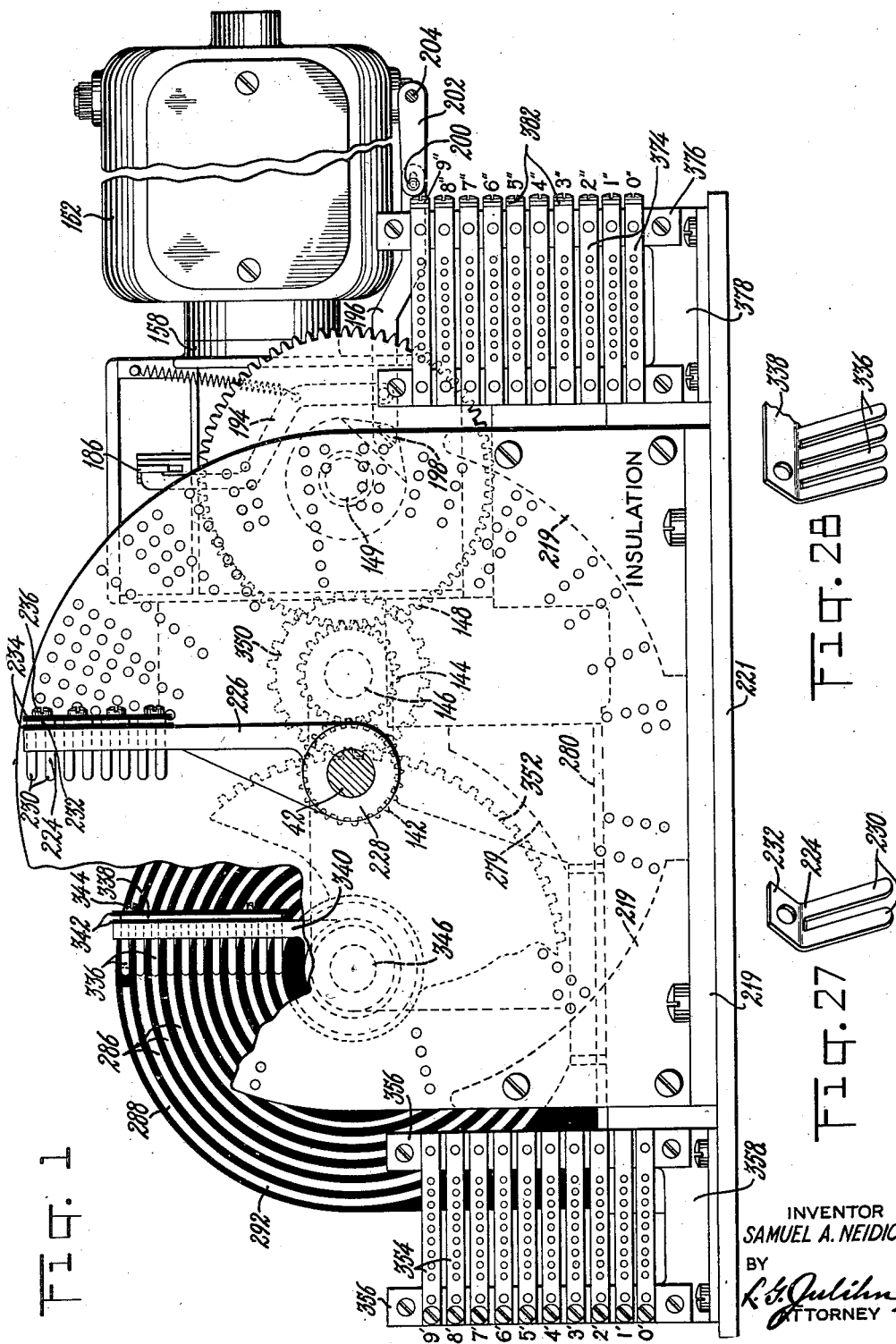

April 24, 1945. S. A. NEIDICH 2,374,374
MULTIPLYING MACHINE
Filed Dec. 30, 1939 12 Sheets-Sheet 2
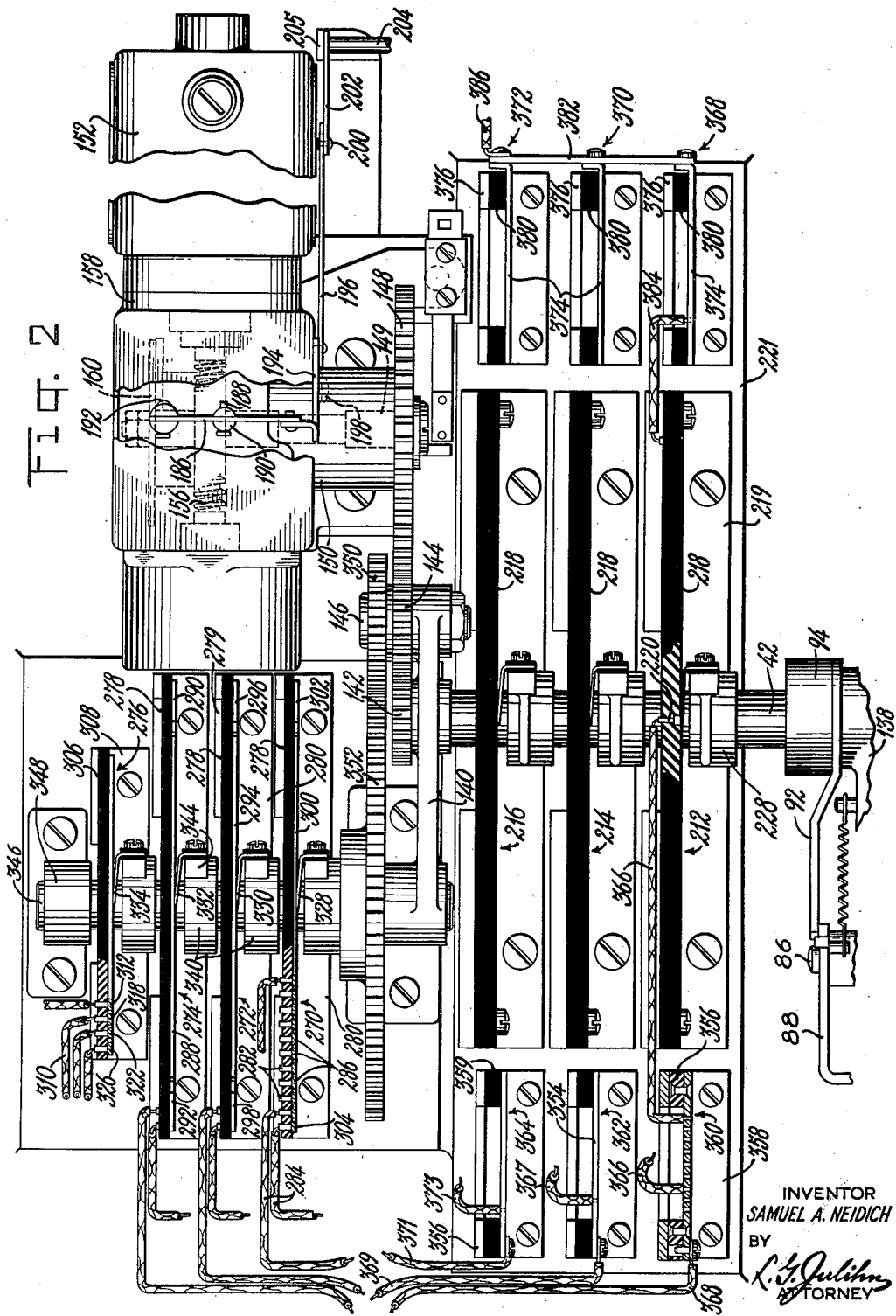
INVENTOR
SAMUEL A. NEIDICH
BY
ATTORNEY

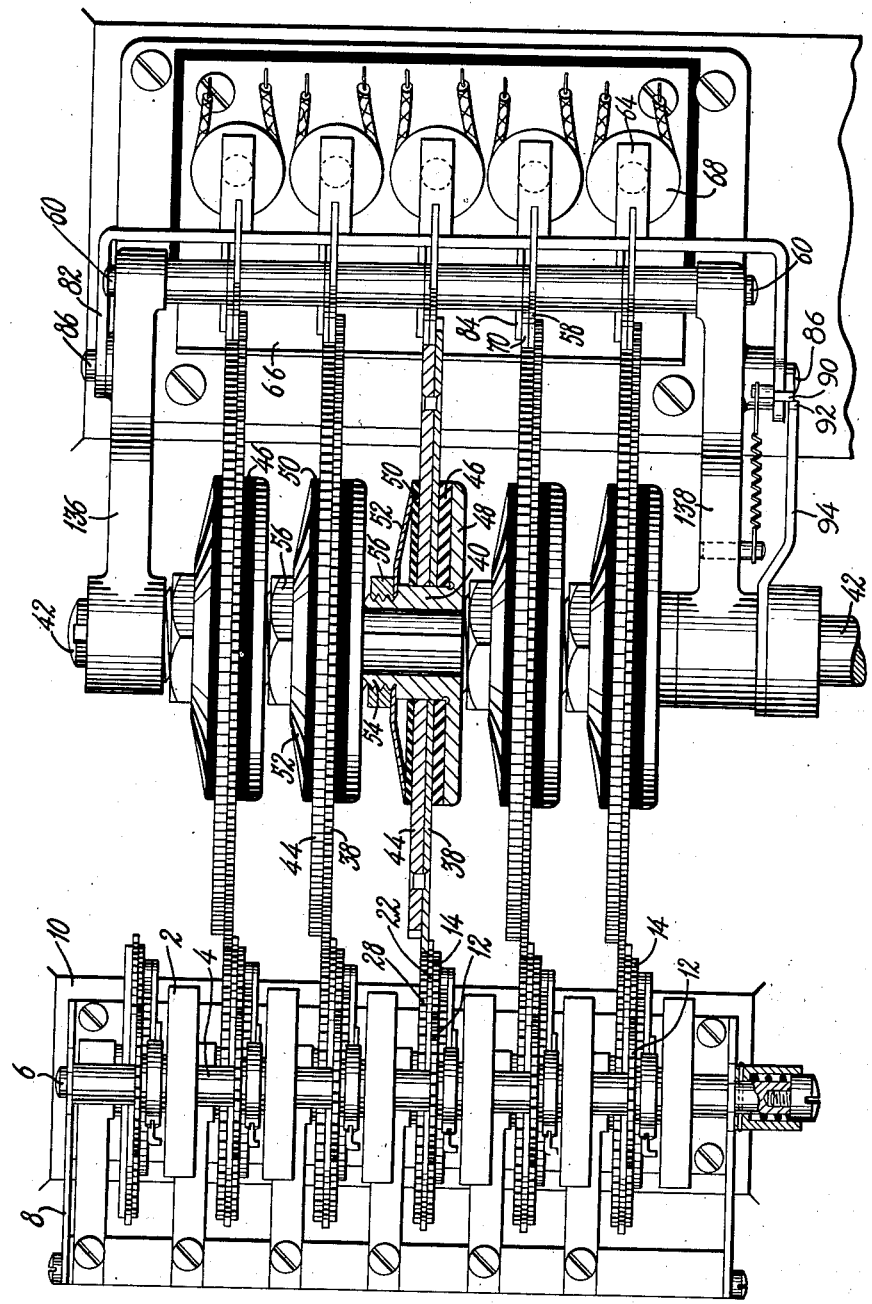

April 24, 1945.  S. A. NEIDICH  2,374,374
MULTIPLYING MACHINE
Filed Dec. 30, 1939  12 Sheets-Sheet 4
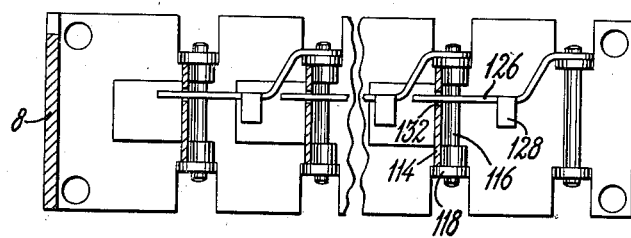
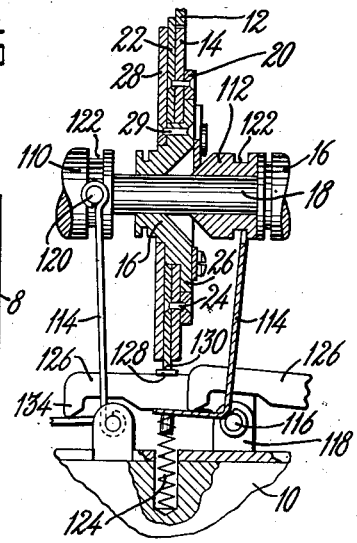
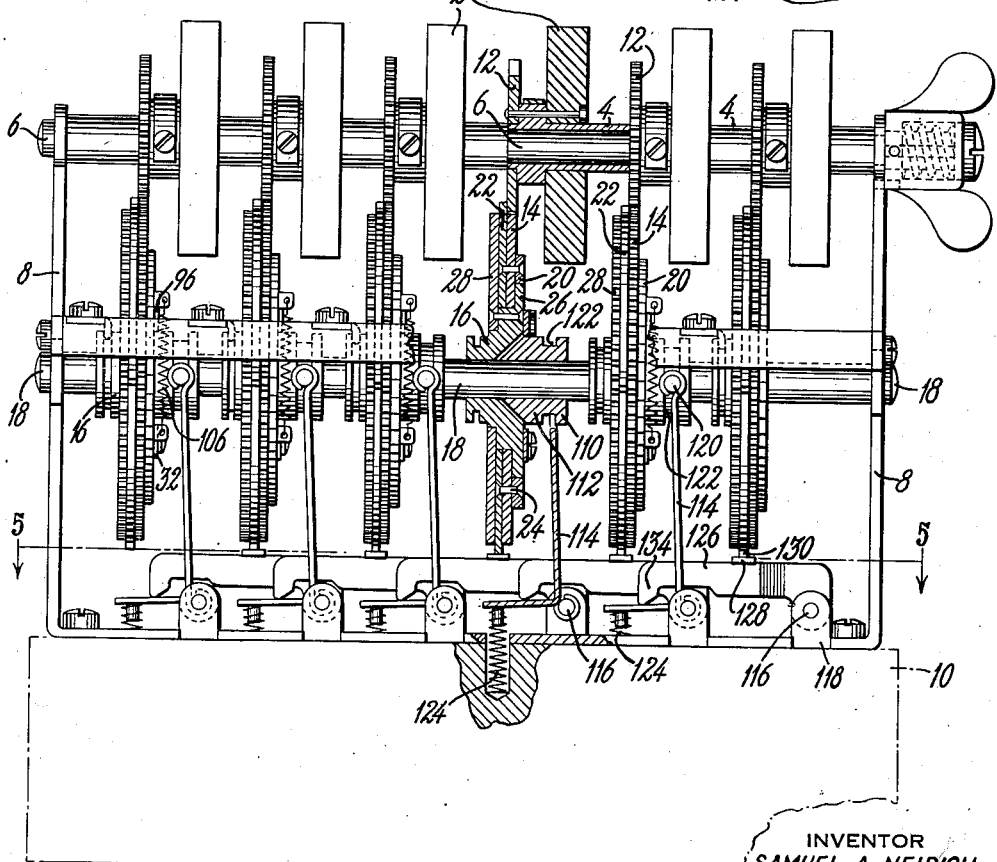
INVENTOR
SAMUEL A. NEIDICH
BY
ATTORNEY April 24, 1945. S. A. NEIDICH 2,374,374
MULTIPLYING MACHINE
Filed Dec. 30, 1939 12 Sheets-Sheet 5
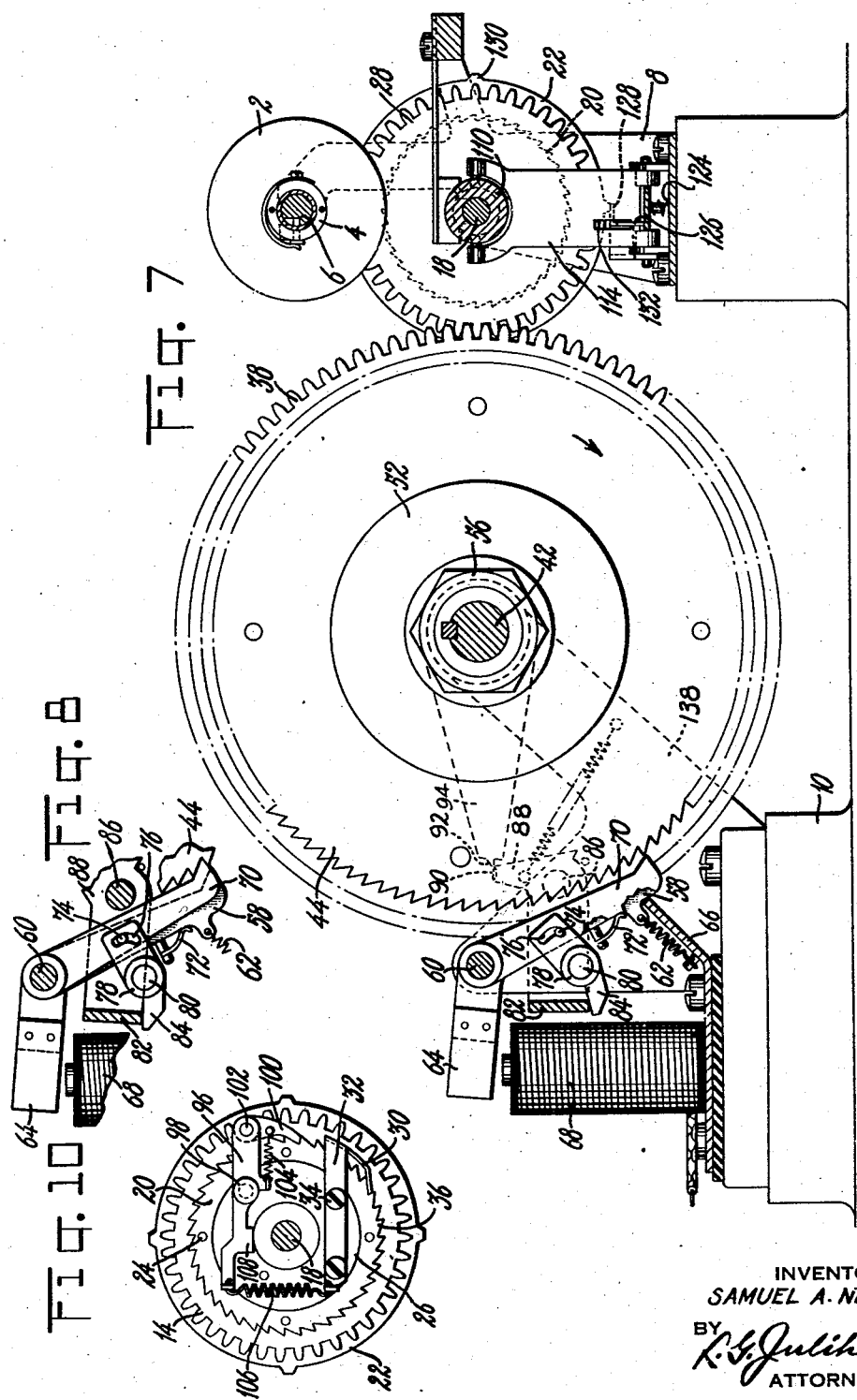
INVENTOR
SAMUEL A. NEIDICH
BY
ATTORNEY April 24, 1945.  S. A. NEIDICH  2,374,374
MULTIPLYING MACHINE
Filed Dec. 30, 1939  12 Sheets-Sheet 6
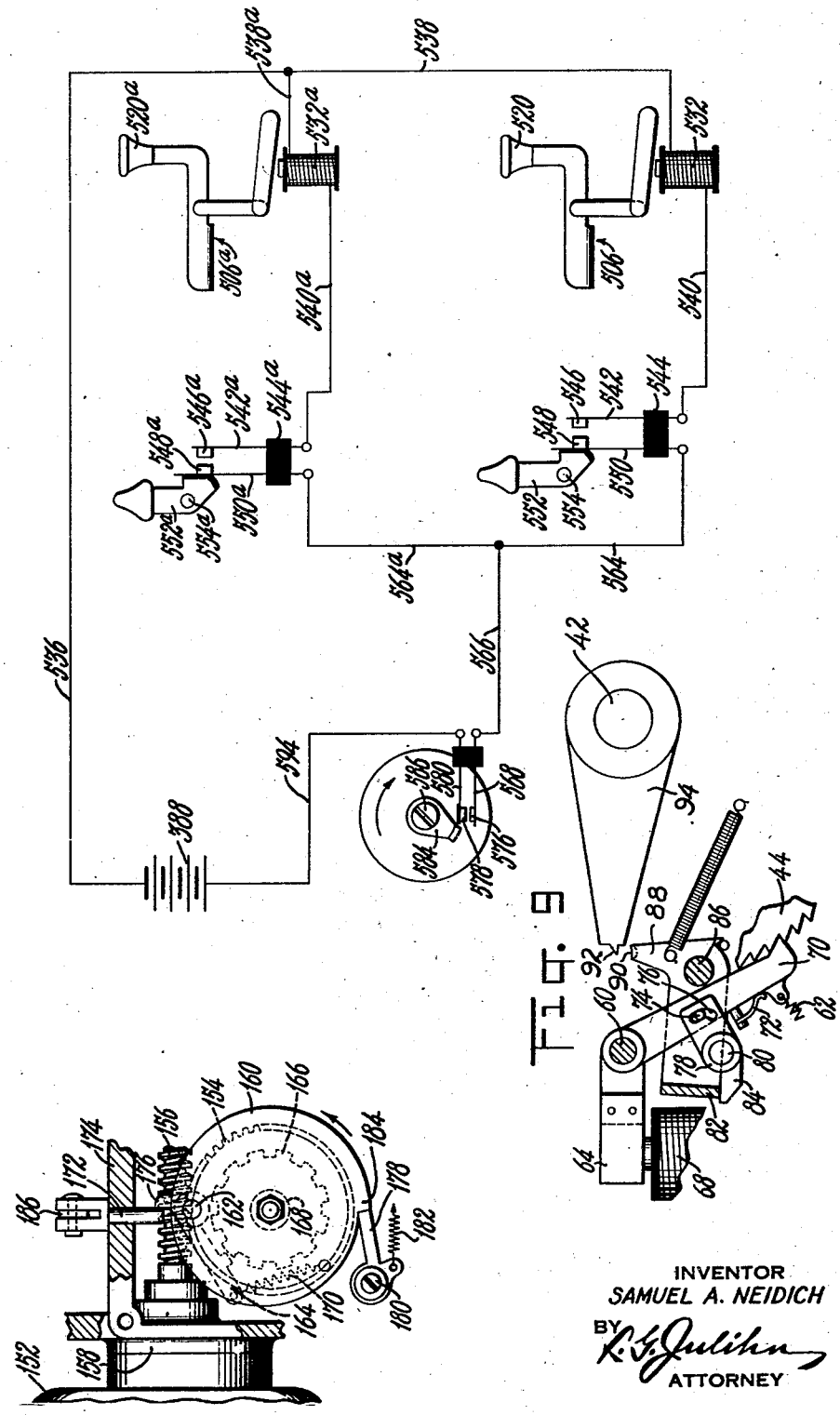
INVENTOR
SAMUEL A. NEIDICH
ATTORNEY April 24, 1945.   S. A. NEIDICH   2,374,374
MULTIPLYING MACHINE
Filed Dec. 30, 1939   12 Sheets-Sheet 7
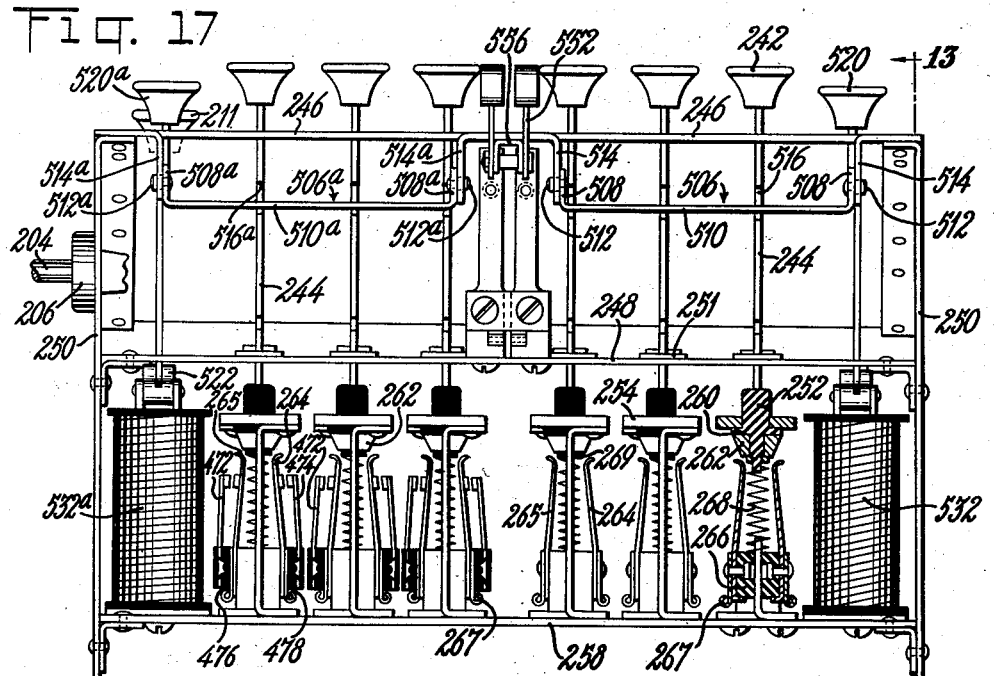
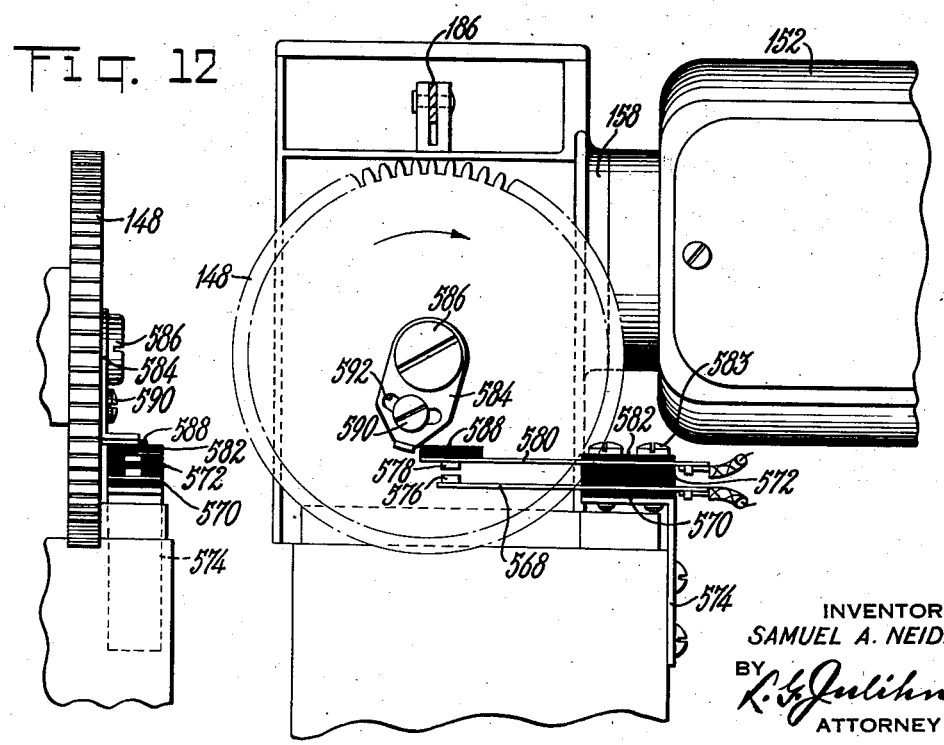
INVENTOR
SAMUEL A. NEIDICH
BY
ATTORNEY

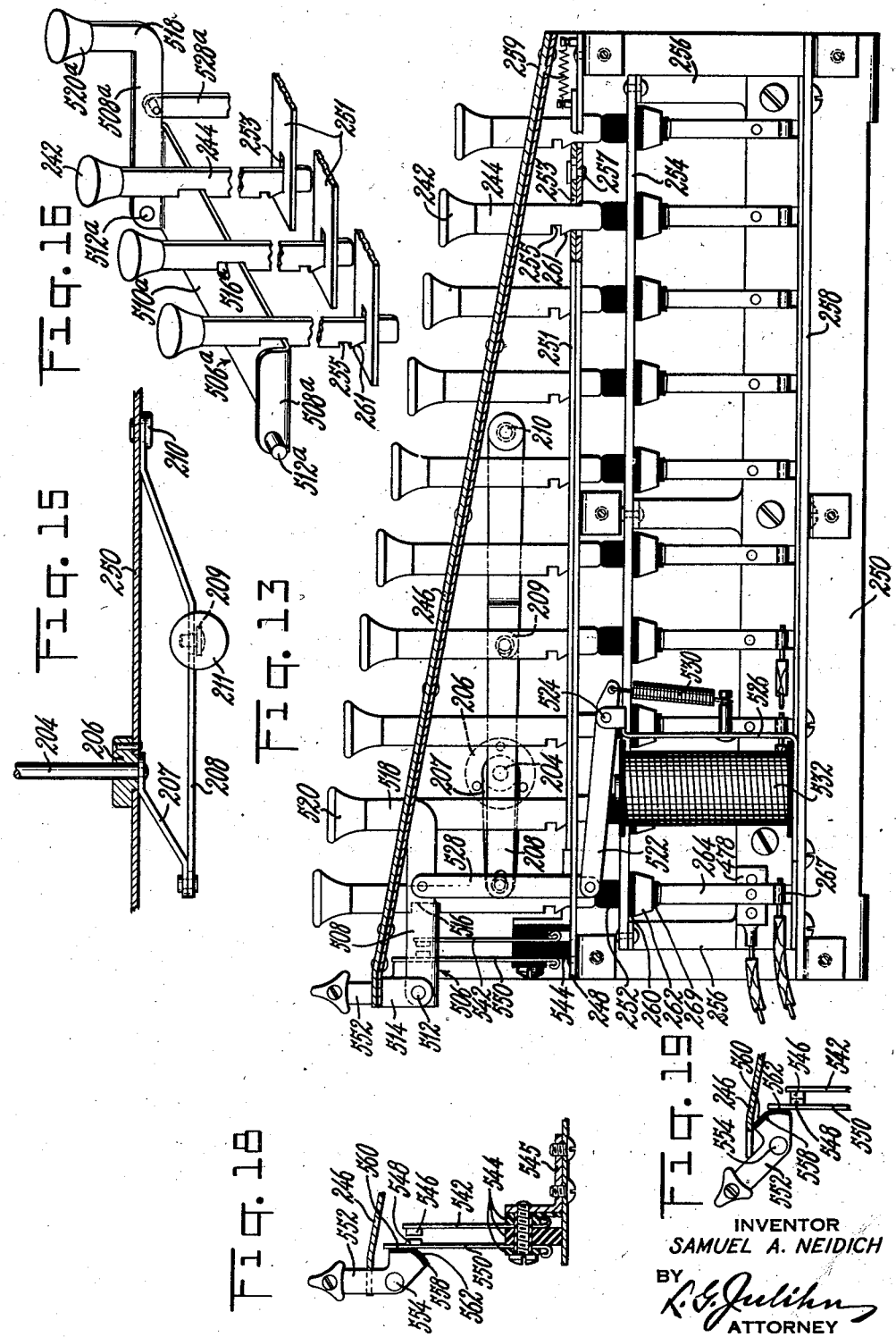

April 24, 1945.    S. A. NEIDICH    2,374,374
MULTIPLYING MACHINE
Filed Dec. 30, 1939    12 Sheets-Sheet 9
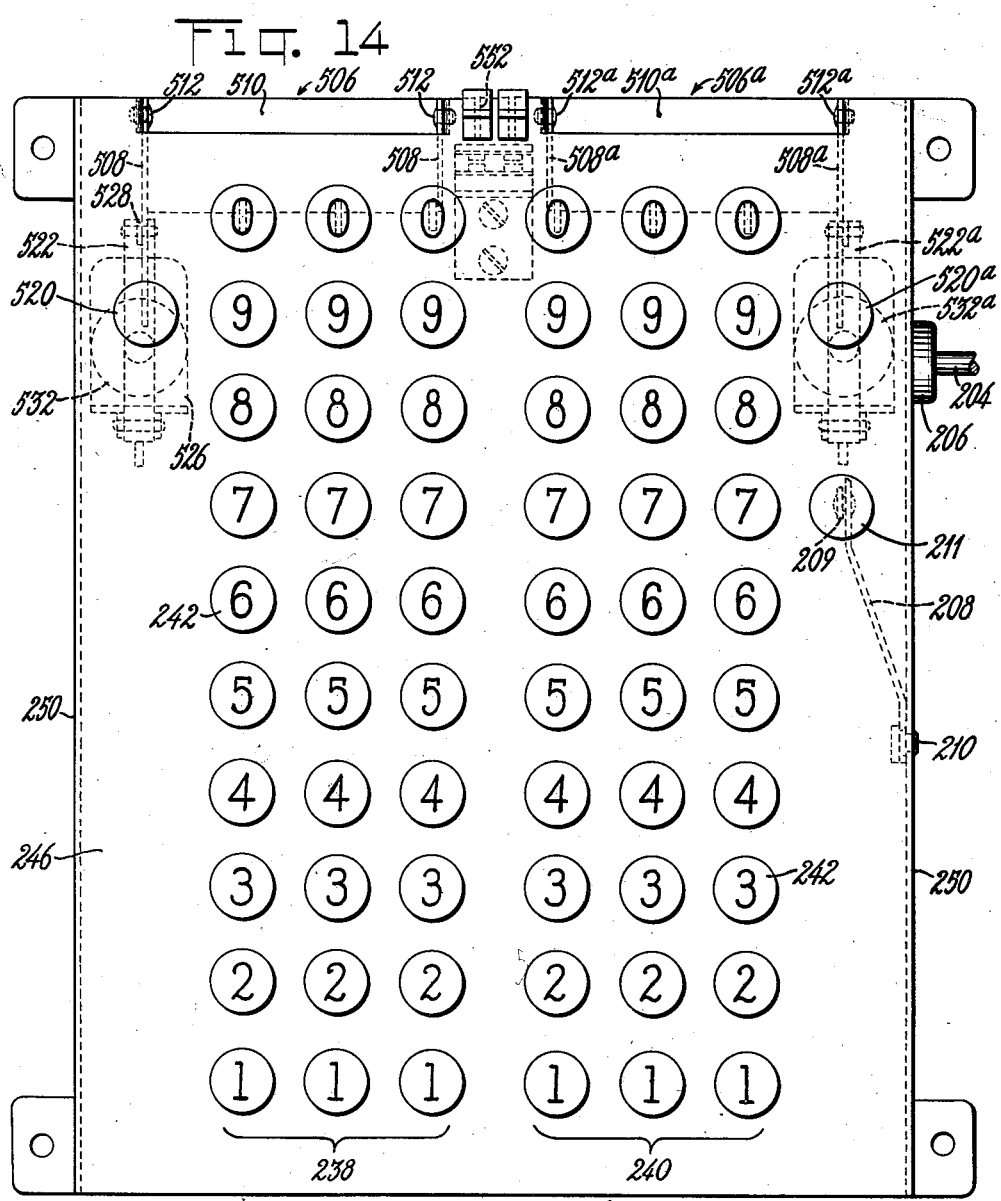
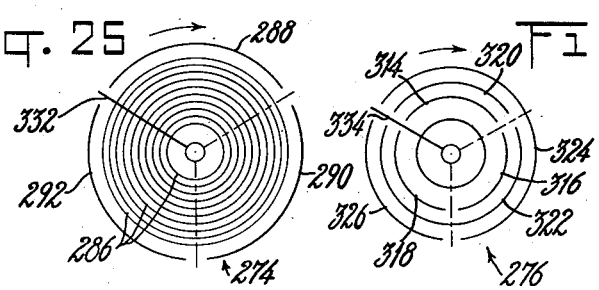
INVENTOR
SAMUEL A. NEIDICH
BY
L. G. Julihn
ATTORNEY

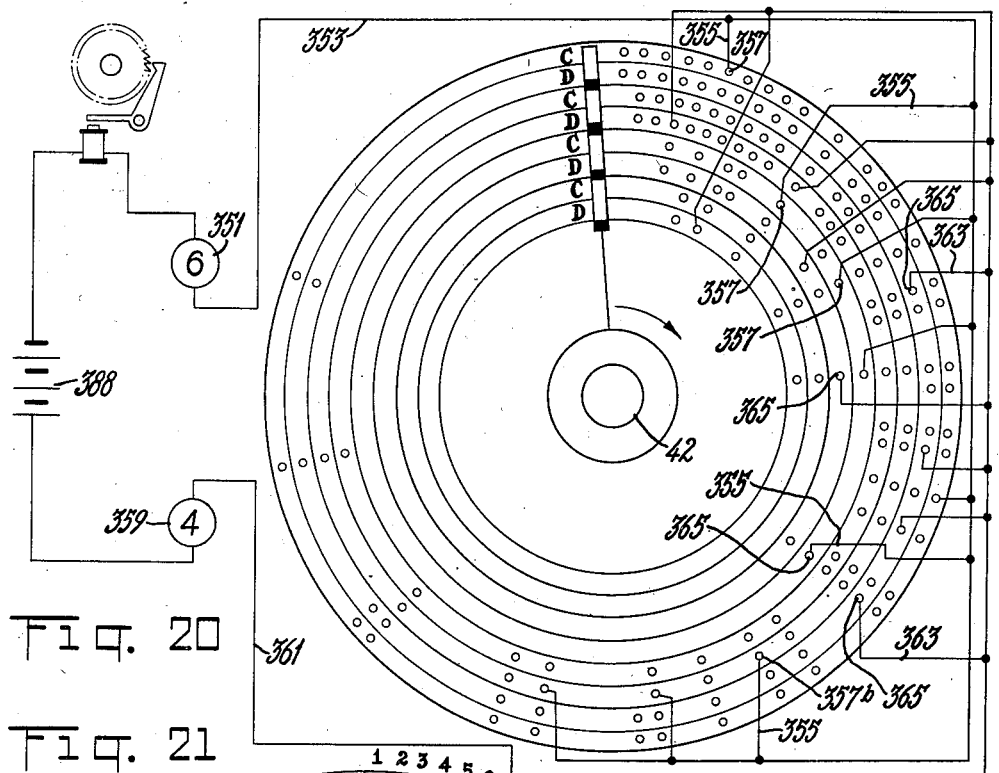
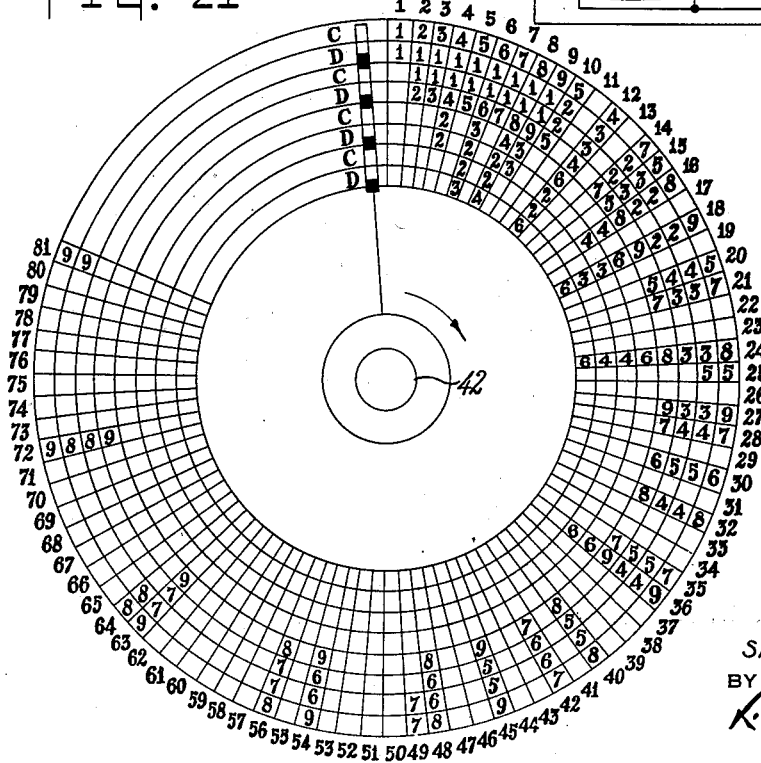
Fig. 20
Fig. 21
INVENTOR
SAMUEL A. NEIDICH
BY
ATTORNEY

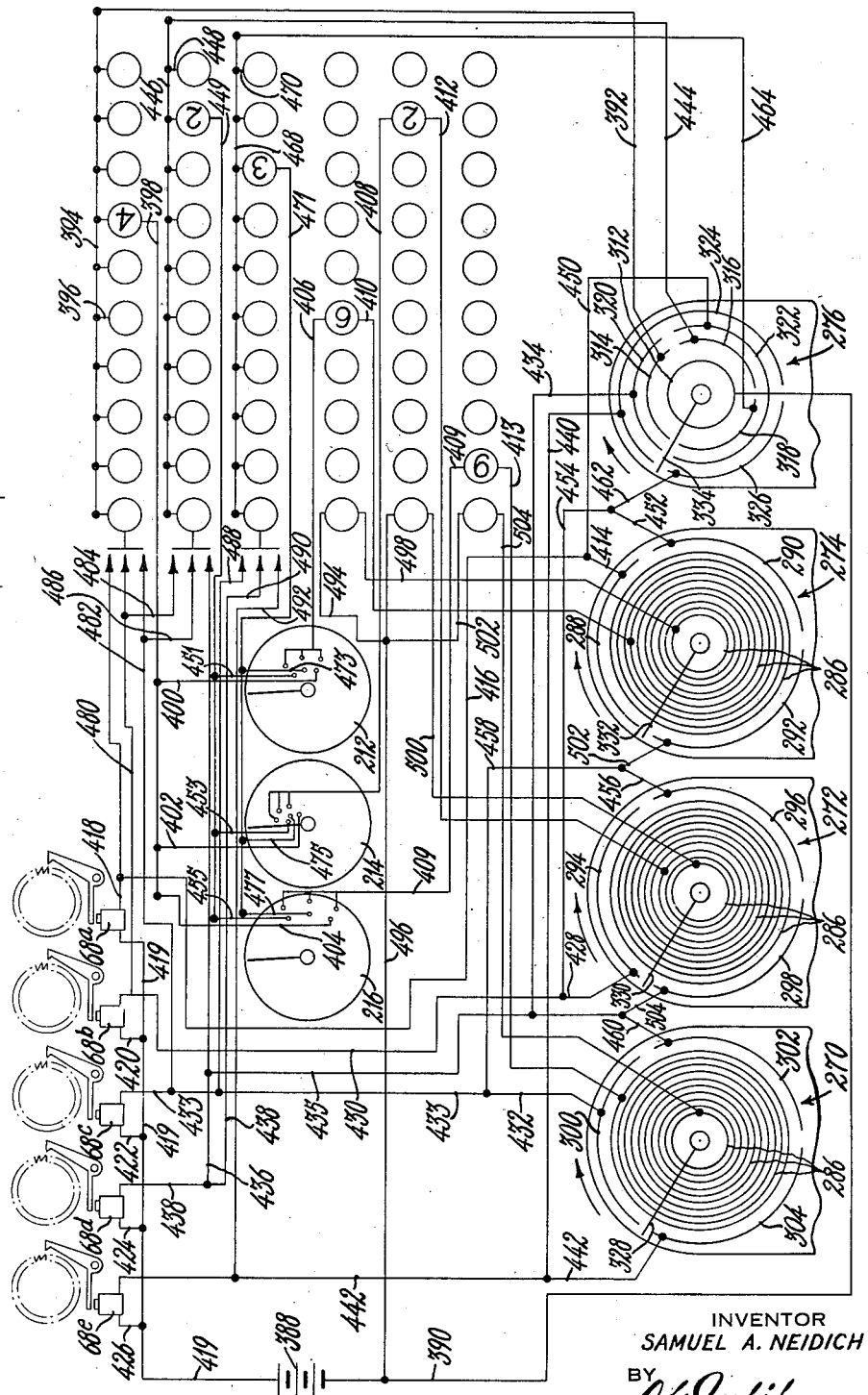

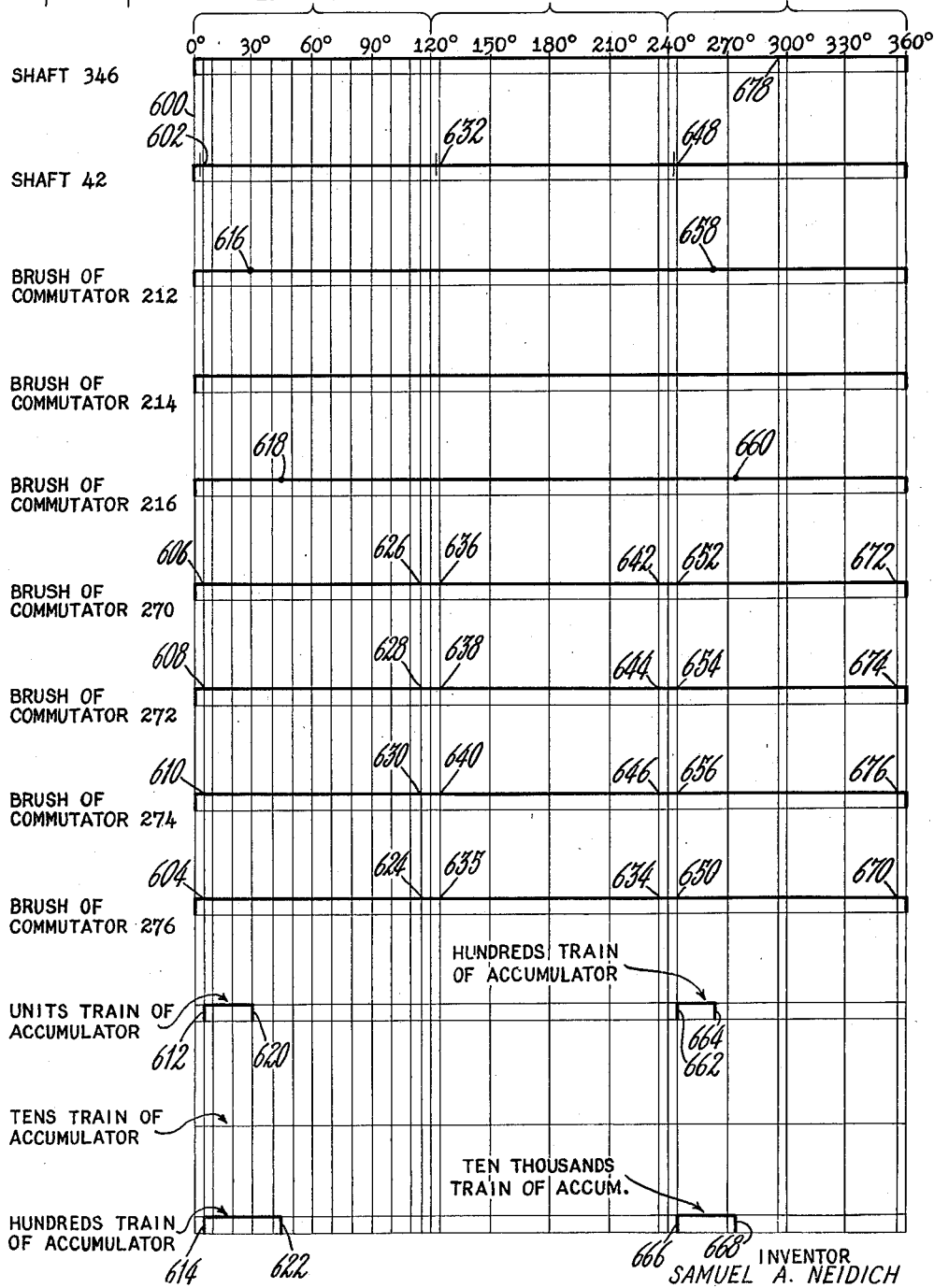

Patented Apr. 24, 1945

2,374,374

UNITED STATES PATENT OFFICE 2,374,374

MULTIPLYING MACHINE

Samuel A. Neidich, Ventnor City, N. J., assignor to Underwood Corporation, a corporation of Delaware Application December 30, 1939, Serial No. 311,733

3 Claims. (Cl. 235—61)

This invention relates to a multiplying machine and more particularly to a multiplying machine employing electrical circuits for controlling the action of product receiving registers.

One object of the invention is to produce a novel and improved multiplying machine of the above type which is simple in construction as compared with prior machines and reliable in operation and by which factors containing any number of digits within the capacity of the machine may be multiplied rapidly and efficiently.

Another object of the invention is to improve the construction and mode of operation of multiplying machines and to produce an improved and simplified machine for multiplying numbers by the partial product method.

Another object of the invention is to produce a novel and improved multiplying machine in which the several complete partial products resulting from the multiplication of the several digits of the multiplicand by a digit of the multiplier are taken in one operation and accumulated upon a single accumulator or register.

Another object of the invention is to produce a multiplying machine in which partial products resulting from the multiplication of the several digits of a multiplicand by one of the digits of a multiplier containing a plurality of digits are accumulated in each cycle and are combined in each cycle with the products obtained in the preceding cycle upon a single accumulator.

With the above and other objects in view, the invention consists in a multiplying machine embodying the novel and improved features, constructions and combinations of parts hereinafter described and particularly pointed out in the claims, the advantages of which will be readily understood and appreciated by those skilled in the art.

The various features of the invention will be clearly understood from the accompanying drawings illustrating the invention in its preferred form and the following detailed description of the constructions therein shown.

In the drawings:

Fig. 1 is a view in side elevation illustrating the commutators, the driving mechanism and certain of the electrical conductors of the machine, Fig. 2 is a plan view of the mechanism shown in Fig. 1, Fig. 3 is a plan view illustrating the accumulator or register mechanism of the machine with the shaft 42 shown in a reversed position as compared with Fig. 2, Fig. 4 is a view in front elevation illustrating the register mechanism with certain parts shown in section, Fig. 5 is a detail view in horizontal section taken substantially on the line 5—5 of Fig. 4, Fig. 6 is a detail view in vertical section illustrating particularly the transfer mechanism of the register with certain of the parts in different positions from the positions in which they are shown in Fig. 4, Fig. 7 is a view in side elevation illustrating the register mechanism with certain parts shown in section, Fig. 8 is a view similar to Fig. 7 illustrating a portion of the mechanism shown in Fig. 7 with certain of the parts in different positions, Fig. 9 is a view similar to Fig. 8 of the mechanism shown in said figure with certain of the parts in still different positions, Fig. 10 is a detail view in side elevation illustrating particularly the transfer mechanism, Fig. 11 is a detail view in side elevation illustrating particularly the mechanism for automatically restoring the depressed keys after a multiplying operation, Fig. 12 is a view in rear elevation looking from the left, of certain parts of the mechanism shown in Fig. 11, Fig. 13 is a view in side elevation partly in section illustrating the keyboard mechanism of the machine, Fig. 14 is a plan view of the keyboard mechanism, Fig. 15 is a detail view partly in plan and partly in horizontal section illustrating certain parts of the mechanism for tripping the starting clutch of the machine, Fig. 16 is a detail perspective view illustrating certain parts of the zero key mechanism, Fig. 17 is a view in rear elevation, partly in section, of the keyboard mechanism, Fig. 18 is a detail view partly in side elevation and partly in section, illustrating certain parts of a manually controlled mechanism for restoring the depressed keys of the keyboard, Fig. 19 is a view similar to Fig. 18 illustrating a portion of the mechanism, shown in Fig. 18 with certain of the parts in different positions, Fig. 20 is a diagrammatic view illustrating the electrical connections of one of the multiplying commutators, Fig. 21 is a diagrammatic view illustrating the arrangement of the factor contacts of one of the multiplying commutators, Fig. 22 is a diagrammatic view illustrating the arrangement of the electrical conductors for the mechanism for restoring the depressed keys at the end of the multiplying operation, Fig. 23 is a detail view in side elevation illustrating certain parts of the driving mechanism of the machine and the controlling means therefor, Fig. 24 is a diagrammatic view illustrating the arrangement of the electrical conductors and associated parts of the machine, Figs. 25 and 26 are diagrammatic views illustrating the cycle commutator mechanism, Figs. 27 and 28 are detail perspective views illustrating the construction of the brushes of the commutators and Figure 29 is a diagrammatic view illustrating the timing of various parts of the machine in performing a multiplication.

The present machine is constructed and arranged for the multiplication of numbers in which both the multiplicand and multiplier each consists of a number having three digits or a less number of digits. Employing the principles herein set forth, however, a machine may be constructed for multiplying numbers in which the multiplicand and multiplier comprise any number of digits.

The machine comprises a register or accumulator mechanism illustrated in Figs. 3 to 10 inclusive, in which the several partial products are entered. This register mechanism includes a series of trains of accumulator or register wheels equal in number to the sum of the digits in the multiplicand and multiplier, each train operating independently of the others except for the operation of the transfer mechanisms. In the first cycle of the machine in which the three digits of the multiplicand are multiplied by the units digit of the multiplier, the first three trains of accumulator wheels numbering from the right when looking at the front of the register mechanism, are employed primarily to receive the partial products, the fourth train from the right being used merely to receive an actuation through the transfer mechanism from the third train. In the second cycle of the machine in which the several digits of the multiplicand are multiplied by the tens digit of the multiplier, the second, third and fourth trains of accumulator wheels, numbering from the right, are used primarily to receive the partial products, the fifth train being employed merely to receive an actuation from the fourth train through the transfer mechanism. During the third cycle of operations of the machine in which the several digits of the multiplicand are multiplied by the hundreds digit of the multiplier, the third, fourth and fifth trains of accumulator wheels are primarily employed to receive partial products, the sixth train being actuated only through the transfer mechanism from the fifth train during this cycle.

The register mechanism comprises a series of indicating or value wheels 2 each fixed to a sleeve 4 rotatably mounted on a normally stationary shaft 6 supported in bearings in side plates 8 secured to the base 10 of the machine. Upon the sleeve 4 is fixed a gear wheel 12 meshing with a gear wheel 14 forming one member of a unit rotatably mounted on a driving hub 16 journaled on a fixed shaft 18 also supported at its ends in the side plates 8. Said unit also comprises a toothed ring 20 and a disk 22 and these three elements are secured together by a series of pins or rivets 24. The unit is held from axial movement in one direction on the driving hub 16 by means of a flange 26 on said hub 16 and is held from axial movement in the opposite direction on said hub by means of a gear wheel 28 secured to the hub by means of rivets 29 as shown in Figs. 4 and 6.

The unit is normally driven from the hub by means of a yielding driving pawl 30 (see Fig. 10) formed on a supporting plate 32 secured to the driving hub by means of screws 34. This pawl is arranged to engage the ratchet teeth 36 formed on the periphery of the ring 20 to drive the unit and the value wheels.

The driving hub 16 is itself driven by means of a gear wheel 38 meshing with the gear wheel 28. The gear wheel 38 is mounted upon a supporting sleeve or carrier 40 fixed upon a shaft 42 mounted in bearings formed on suitable brackets secured to the frame of the machine and the shaft 42 is driven continuously during the multiplication of the multiplicand by the several digits of the multiplier. The gear 38 is arranged to be driven from the sleeve 40 under certain conditions through a suitable frictional driving mechanism.

To each of the gears 38 is secured a peripherally toothed disk 44, this disk and the gear rotating as a unit when driven from the sleeve 40. The gear 38 is engaged on one side by a disk or washer 46 of suitable friction material such as rubber, this disk being interposed between the gear and a radially extending flange 48 formed on the sleeve 40. The toothed disk 44 is engaged upon its outer face by a disk or washer 50 of suitable friction material mounted on the sleeve 40 and interposed between the toothed disk and a dished spring disk 52 secured to the sleeve. This spring disk is provided with a central opening through which a reduced hub portion 54 of the sleeve passes, the disk resting against a shoulder on the sleeve, and the disk is secured in place on the sleeve by means of a nut 56 threaded on said reduced extension.

Each of the toothed disks 44 is provided with more than 81 teeth. In the present construction each of these disks is provided with 100 teeth. During a multiplying cycle, in which the several digits of the multiplicand are multiplied by one digit of the multiplier, the gear 38 and the disk 44 of each register or accumulator train in operation during said cycle, is rotated until the partial product corresponding to the particular train is entered in the value wheels and the rotation of the disk 44 and the gear 38 is then arrested to retain said partial product in said wheels until the completion of the cycle. The rotation of the disk 44 is arrested, when a particular partial product corresponding to the train in which said disk is located is registered in the value wheels, by means of a pawl 58 pivoted on a shaft 60 extending along the trains of accumulator wheels substantially parallel with the shaft 42, said pawl being arranged to engage the peripheral teeth on the disk 44 to arrest the rotation of the disk. The pawl is acted upon by a coiled spring 62 which normally maintains the pawl in its outer position out of engagement with the teeth of said disk, the outward movement of the pawl being limited by means of a stop plate 66 secured to the base of the machine. To the pawl is secured an armature 64 which is acted upon by an electro-magnet 68 when said magnet is energized to throw the pawl into engagement with the teeth of the disk 44.

The magnet 68 is energized through the action of a rotating commutator at a predetermined point in a multiplying cycle determined by the factors which are multiplied by the bridging of two contacts of said commutator representing the factors to be multiplied and, when energized by this action of the commutator, is almost immediately thereafter de-energized by the continued movement of commutator, allowing the pawl to be thrown out by the action of the spring 62. A second pawl is provided, however, for holding the disk 44 stationary during the remainder of the multiplying cycle. This pawl indicated at 70, is pivotally mounted on the shaft 60 by the side of the pawl 58 and is engaged by a leaf spring 72 secured to a pawl 58 so that the pawl 70 is swung into engagement with the teeth of the disk 44 at the same time as the pawl 58. The pawl 70, however, is not swung out of engagement with the teeth of said disk 44 with the pawl 58 but remains in engagement with the disk until the completion of the cycle to hold the disk and the corresponding gear 38 from rotation. At the beginning of a cycle the pawl 70 is thrown out of engagement with the disk 44 to start the rotation of said disk and the actuation of the corresponding train of the accumulator. The mechanism for throwing out the pawl immediately releases the pawl after its disengagement from the toothed wheel so that it may be immediately returned to engagement with said wheel by the corresponding pawl 58 in the event that the magnet 68 for actuating the latter pawl is energized.

The pawl 70 carries a pin 74 which engages in a cam slot 76 formed in a pawl actuating and locking lever 78 pivoted on a stud 80, said slot being shaped as clearly shown in Fig. 7. When the pawl 70 is located in its outer position out of engagement with the disk 44, the pin 74 is located in the lower portion of the slot 76 as shown in Fig. 7. When the pawl 70 is carried upwardly into engagement with the disk 44 by the movement of the pawl 58, the pin 74 is carried into the upper portion of the slot 76 by the movement of the pawl as shown in Fig. 9, the lever 78 being rotated in a clockwise direction by the action of the pin 74 in the lower inclined or cam portion of the slot. This movement of the parts locates the pin 74 in a portion of the slot 76 which is substantially concentric with the arc of rotation of the lever 78, the latter part of the movement of the lever to locate the pin beyond the inclined portion of the slot being produced by momentum, so that the pawl 70 is locked from outward movement away from the disk 44. At the beginning of a multiplying cycle each of the levers 78 is rotated in a counter-clockwise direction by means of a bail 82 extending along the series of trains of accumulators and arranged to engage an arm 84 formed on each of the levers 78. The bail 82 is provided with spaced arms pivoted at 86 on the frame of the machine (see Fig. 3) one of which arms is provided with an extension 88 (see Fig. 7) having a projection 90 at its upper end arranged to engage a cam projection 92 formed on an arm 94 secured to the shaft 42. The engagement of the projection 92 with the projection 90 on arm extension 88 actuates the bail 82 to swing the several levers 78 in a counter-clockwise direction to disengage pawls 70 from the disks 44. The cam projection 92 is so constructed and arranged that it engages the projection 90 during a relatively small part of a revolution of the arm 94 and shaft 42 and that immediately after the disengagement of the pawls 70 from the respective disks 44, the cam projection will be disengaged from the projection 90 to release the pawls 70 so that the latter pawls may be re-engaged with the respective wheels.

With the above construction, in the event that one of the magnets 68 is energized and the corresponding pawl 58 is held by the magnet in engagement with the corresponding toothed wheel 44 when the bail 82 is actuated, the spring 72 will yield to permit disengagement of the pawl 70 from the wheel, without disturbing the pawl 58. Then when the bail releases the pawl 70, said pawl will be moved back into engagement with the toothed wheel by the spring 72.

In the present construction there are two sets of value indicating numbers from naught to nine on the value wheels 2, a half rotation of each value wheel registering an addition of ten in each wheel. The ratio of the gear 14 to the gear 12 is two to one and the ratio of the gear 38 to the gear 28 is two and one half to one. Therefore, during each complete rotation of the gear 38 and the toothed disk 44 of each train of the accumulators, the corresponding value wheel will rotate through five revolutions.

The register is provided with a series of improved transfer mechanisms each of which will operate to transfer carry values or increments from the train of accumulator wheels of lower order to which it is applied to the next higher order whether the wheels of the latter accumulator train are stationary or are in rotation. Each transfer mechanism comprises a lever 96 (see Fig. 10) pivoted at 98 to the driving hub 16 and carrying a pawl 100 pivoted at 102 on the lever and acted upon by a coiled spring 104 which maintains the pawl in engagement with the teeth of the ring 20. The lever 96 is acted upon by a coiled spring 106 which maintains a contact projection 108 on the lever in engagement with an actuator 110 rotatably and slidably mounted on the shaft 18 and having a conical portion 112 for engagement with the lever. At all times except during a transfer operation the actuator 110 is located on the shaft 18 in a position remote from the driving hub 16 as illustrated in Fig. 6, the lever 96 then engaging the inner left hand portion of the conical surface of the actuator as shown in said figure. During a transfer operation, the actuator 110 is moved along the shaft 18 from the position shown in Fig. 6 to the position shown in Fig. 4. During this movement of the actuator, through the engagement of the lever 96 with the conical portion of the actuator, the lever is swung in a clockwise direction (Fig. 10) thereby turning the toothed ring 20 one tooth forwardly with relation to the driving hub and advancing the gear 14 with relation to the driving gear 28 to enter an additional unit in the value wheel 2, the spring pawl 30 then engaging the ring 20 one tooth in back of its former position. This action will occur whether the driving hub is rotating or whether it is stationary.

The mechanism for moving the actuator 110 from the position shown in Fig. 6 to the position shown in Fig. 4 comprises a bell crank lever 114 pivoted on a stud 116 having its ends supported in projections 118 on a bracket secured to the base of the machine, the upwardly extending arm of which lever is forked to embrace the actuator 110 and carries pins 120 secured in the respective arms of the fork which engage in a groove 122 in the actuator. The laterally extending arm of the lever 114 is acted upon by a coiled spring 124 which normally maintains the lever in the position shown in Fig. 6 with the actuator in its right hand position on the shaft 18. The lever 114 is swung in a counter-clockwise direction. Figs. 4 and 6 to shift the actuator from the position shown in Fig. 6 to that shown in Fig. 4 by means of a lever 126 which is pivoted upon the end portion of one of the studs 116 and is provided with a laterally extending contact projection 128 arranged to be engaged by a cam projection 130 formed on the corresponding disk 22. Each of the levers 126 extends laterally of the machine from its pivotal point beneath the disk 22 of the train of accumulator wheels corresponding to one order of the register mechanism and through an opening or slot 132 (see Fig. 5) in the upwardly extending arm of the bell crank lever 114 of the transfer mechanism of the accumulator train of the next higher order and is formed with a downwardly projecting end portion 134 arranged to engage the laterally extending arm of said bell crank.

When a value wheel 2 of one of the trains of accumulators is moving from the nine position to the naught position the cam 130 on the disk 22 of said train engages the projection 128 on the lever 126 and depresses said lever. The depression of said lever moves the actuator 110 of the train of the next higher order to the left (Figs. 4 and 6) from the position shown in Fig. 6 to that shown in Fig. 4 thereby actuating the lever 96 and the pawl 100 to advance the gear 14 with relation to the gear 28. By this advance movement of gear 14 the value wheel of the train of said higher order is advanced a distance sufficient to enter an additional one in said value wheel. Since the gear 14 and the disk 22 for each train of the accumulators make a quarter of a revolution for the rotation of each value wheel a distance corresponding to ten number spaces, there are four of the cam projections 130 formed on each disk 22 to actuate the transfer mechanism once for each quarter of a revolution of the disk 22 and gear 14.

In the construction shown, the train of accumulator wheels at the extreme right in Fig. 4 is the units train, the next train to the left the tens train and so on. These trains correspond to the train adjacent the bottom of the sheet, the next higher train and so on, in Fig. 3. There is, of course, no actuator 110, lever 96 or pawl 100 for the units train and no lever 126 for the hundred thousands train which is incomplete, the train having no gear 38 or wheel 46. The toothed ring 20 of the units train might be fixed to the driving hub since there is no relative movement between these parts as is required in the other trains for the transfer operation. In order to employ uniform parts in the several trains, however, ring 20 of the units train is driven from the driving hub by means of a spring pawl 30 secured to said hub.

The shaft 42 is mounted in bearings in brackets 136, 138 and 140 secured to the base of the machine. To the inner end of the shaft 42 is fixed a pinion 142 meshing with a pinion 144 of the same size rotatably mounted on a stub shaft 146 secured in bracket 140. The pinion 144 meshes with a gear 148 fixed to one end of a shaft 149 journaled in a bearing sleeve secured in a boss 150 formed on the frame. The ratio of the gear 148 to the pinion 144 is three to one so that by a single rotation of said gear, shaft 42 is given three revolutions. The shaft 149 is driven from an electrical driving motor 152 through mechanism comprising a one revolution clutch and having the same general construction, arrangement and mode of operation of parts as the mechanism for driving the corresponding shaft illustrated and described in the patent to Sundstrand No. 1,925,735, dated September 5, 1933. This mechanism comprises a worm wheel 154 (see Figs. 2 and 23) mounted on the shaft 149 to turn freely with relation to said shaft and meshing with a worm 156 journaled in bearings carried by the housing or casing 158 and connected with the shaft of the driving motor 152, the worm wheel being continuously rotated during the operation of the motor.

The one revolution clutch is arranged to connect the worm wheel 154 with the shaft 149. To the end of the shaft 149 adjacent the worm wheel is fixed a disk 160 upon which is pivoted at 162 a pawl 164 having a tooth arranged to engage between the teeth 166 formed on a hub 168 to which the worm wheel 154 is secured. The pawl 164 is acted upon by a spring 170 which tends to swing the pawl into engagement with the teeth 166 of the hub 168 and thereby effect a driving connection between the worm wheel 154 and the shaft 149.

The pawl 164 is held out of engagement with the teeth of the hub 168 to disconnect the worm wheel and shaft 149 by means of a detent pin 172 mounted for vertical reciprocatory movement in a plate 174 forming a part of the inner casing of the driving mechanism, said pin being arranged to engage a projection 176 formed on the pawl as shown in Fig. 23. In order to prevent reverse movement of the disk 160, under the action of the spring 170 when the pawl is moved to disengaged position, a dog 178 is pivoted at 180 on the frame and is acted upon by a spring 182 which maintains the same in engagement with the disk 160. The dog 178 is arranged to engage a shoulder 184 on the disk when the pawl 164 is disengaged from the hub 168 to prevent reverse rotation of the disk and shaft 149.

The position of the pin 172 is controlled by means of a lever 186 pivoted at 188 upon a supporting stud 190 extending upwardly from the inner casing of the driving mechanism, said lever having one end thereof connected with said detent pin by a connecting pin 192 engaging in a slot in the lever. The other end of the lever 186 is connected by a link 194 (see Figs. 1 and 2) with a lever 196 pivoted at 198 upon the boss 150. The lever 196 is connected at 200 by a pin and slot connection with an arm 202 secured to one end of a rock shaft 204 mounted to turn in suitable bearing members 205 and 206 attached to the frame of the machine (see Fig. 15). To the other end of this rock shaft is fixed a second arm 207 connected at its rear end by a pin and slot connection to a lever 208 pivoted at 210 on the frame of the keyboard portion of the machine. The lever 208 has a pin and slot connection with a bar 209 mounted for vertical movement in the keyboard portion of the machine and having a key 211 fixed to the upper end thereof.

The machine is provided with a series of multiplying commutators 212, 214 and 216, the number of these commutators corresponding with the number of digits in the multiplicand. That is, the number of these commutators determines the capacity of the machine as far as the number of digits in the multiplicand is concerned. Each of these commutators comprises a plate 218 of insulating material in which are set a series of electrical contact members 220 arranged in arcuate rows or rings and insulated from each other as shown in Fig. 2. Each of these plates is supported in upright position upon a bracket 219 secured to the base plate 221. The shaft 42 passes centrally through these plates and each commutator comprises a series of brushes 224 mounted upon the outer end of an arm 226 having a hub 223 which is fixed to the shaft 42. Each of the brushes 224 comprises two contact fingers 230 connected by a base plate 232, and the base plate of each brush is engaged between insulating plates 234 and is secured to the corresponding arm by screws 236, insulated from the base plates by suitable means (not shown) thereby insulating the brushes from the arms.

In the present construction there are four of these brushes secured to each arm in spaced relation. Each of the fingers 230 of the brushes is arranged to wipe over all the contacts 220 arranged in the same arcuate row or ring upon the corresponding insulating plate 218.

The arrangement of the contacts in each multiplying commutator is clearly shown diagrammatically in Figs. 20 and 21. As shown in these figures, the contacts are arranged in rings about the axis of the shaft 42. The contacts in the alternate rings designated at C in these diagrams are multiplicand contacts, inasmuch as they represent digits corresponding to the digits in the multiplicand involved in a multiplying operation, and the contacts in the other alternate rings indicated at D, are multiplier contacts since they represent digits corresponding to the digits in the multiplier. In Fig. 20 the contacts themselves in each ring are indicated. In Fig. 21, instead of indicating the contacts, the digits in the multiplicand and multiplier to which the several contacts correspond are indicated. The contacts, in addition to being arranged in concentric rings having their centers in the axis of the shaft 42, are arranged in radial rows. The contacts in each multiplicand ring, starting with the outside ring, and the contacts in each adjacent multiplier ring which is arranged inside the multiplicand ring, located in the same radial row, represent factors in a product indicated by the position of said row with relation to a predetermined starting position. The spacing of the several radial rows of contacts is the same as the spacing of the teeth on each of the toothed wheels 44. The brushes are all rotated in a clockwise direction as indicated by the arrows in Figs. 20, 21 and 24. The starting positions of the brushes at the beginning of a cycle are indicated by the dot-and-dash lines in Figs. 20 and 21. The rows of contacts are numbered consecutively in Fig. 21 in a clockwise direction from the starting position of the brush, the numbers of the rows being indicated by the outside ring of numbers in this figure.

During the rotation of the brushes 224 about the axis of the commutator, each brush will connect each contact located in a multiplicand ring with the contact located in a multiplier ring, immediately within said multiplicand ring and in the same radial row as the multiplicand contact.

As an example of the mode of operation, assuming that the toothed wheels are free to rotate, when the brush of a commutator is rotated from the starting position into position to connect the contacts of the number one radial row, the corresponding toothed wheel will have advanced one tooth. The contacts in this row correspond to the digit one in the multiplicand and the digit one in the multiplier, the product of which is the same as the number of the row. As another example, when the series of brushes have rotated into position to engage the contacts of the fourteenth row, the toothed wheel 44 will have rotated a distance of fourteen teeth. The digit factors represented by the contacts respectively in the multiplicand and multiplier rings in this row, are seven and two and two and seven, the product of which in each case equals fourteen, the number of the row or the number of teeth which the wheel 44 has advanced from starting position when the brushes engage the contacts of this row. As another example, when the brushes have rotated to connect the contacts of the forty-second row of the commutator, the wheel 44 will have advanced forty-two teeth during this movement of the brushes. The digit factors represented by the contacts respectively in the multiplicand and multiplier rings in this row are seven and six and six and seven, the products of which in each case equal forty-two, the number of the row and the number of teeth which the toothed wheel 44 has advanced from starting position, when the brushes reach this row.

All the other contacts of each multiplying commutator are arranged in the manner above indicated in connection with the three examples given. It will thus be seen that when the series of brushes of a commutator and the corresponding toothed wheel 44 are rotated from the starting position shown in Figs. 20 and 21, the angular distance that the brushes and the number of teeth said wheel have advanced from starting position when the contacts in any given row are engaged by the brushes, represent the product of the factors represented by the contacts contained in said row. The numbers opposite the several rows in Fig. 21 indicate not only the numbers of the rows, numbering from the starting position of the brushes, but also the number of steps in the movement of the brushes from the starting position to the several rows and also the number of teeth which each toothed wheel rotates to correspond with said movement of the brushes. The number opposite each row of contacts represents the product of a factor represented by a multiplicand contact located in said row and a second factor represented by a multiplier contact located in said row and inside the multiplicand contact.

The machine is provided with a keyboard such as that shown in Figs. 13, 14 and 17. The keyboard comprises a set of multiplicand keys indicated at 238 and a set of multiplier keys indicated at 240. Each set of keys comprises three rows of keys corresponding respectively to the number of digits in the multiplicand and the number of digits in the multiplier within the capacity of the machine. Each row of keys in each set comprises keys representing respectively the digits from zero to nine as shown in Fig. 14.

Each of the keys comprises a key top 242 fixed to the upper end of a key bar 244 mounted to slide vertically in suitable openings in guide plates 246 and 248 supported by the side plates 250 of the frame of the keyboard mechanism.

The key bars 244, when depressed, are each held in depressed position by means of a latch plate 251 one of which is provided for each row of keys. Each latch plate is formed with openings 253 (see Figure 13) to receive the key bars 244 and the latch plate is arranged to engage in slots 255 in the key bars when said bars are depressed to hold the bars in depressed position. Each latch plate is mounted to slide horizontally on the guide plate 248 and is held in place on the guide plate by means of studs 257 secured in the guide plate and engaging in slots in the latch plate which studs limit the movement of the latch plate. The latch plate is acted upon by a coiled spring 259 which tends to move the plate forwardly and engages the plate in the slot 255 in a key bar when the corresponding key is moved to depressed position. Each key bar is formed with an inclined cam face 261 arranged to engage the rear side of the corresponding opening 253 in the latch plate when a key bar is depressed to move the latch plate forwardly against the action of the spring 259. When a key in one of the rows is held in depressed position by the latch plate and another key in said row is depressed, the depression of the second key, by moving the latch plate forwardly, will release the first key and the second key will then be held in depressed position by the latch plate.

Each of the key bars controls a switch located at the lower end of the bar and arranged so that upon the depression of the bar certain contacts in the multiplying circuits are engaged. The lower end of each of the key bars engages the upper end of a cylindrical stud on a block 252 of insulating material which stud is arranged to slide vertically in a suitably shaped guide opening in a bar 254 extending longitudinally of the keyboard and supported at its ends upon brackets 256 extending upwardly from the base plate 258 of the keyboard frame. The upward movement of the insulating block in the bar 254 is limited by a flange 260 on the block which engages the under side of the bar. Each of the insulating blocks carries a conical contact member 262 of the switch mounted on a downwardly extending stud on the block and arranged to engage the two contact spring members 264 and 265 of the switch. The contact springs 264 are secured to opposite sides of a bar 266 of insulating material extending longitudinally of the keyboard and the lower portion of each contact spring is provided with an eye 267 to receive a suitable conductor as shown in Fig. 17. The insulating bar 266 is attached to the base plate 258 of the keyboard. Each insulating block 252 is acted upon by a coiled spring 268 interposed between the bar 266 and a perforated washer 269 mounted on the downwardly extending stud on said block which normally maintains the block in its uppermost position in the bar 254 and also normally maintains the corresponding key bar and key in their uppermost positions. In both the set of mutiplicand keys and the set of multiplier keys of the keyboard, the keys of the right hand row of the set (Fig. 14) are the units keys and the next row to the left are the tens keys and the left hand row are the hundreds keys. In the units row of the set of multiplicand keys, the contact spring 264 corresponding to each key except the zero key is connected by a series of conductors with the respective contacts of the multiplicand rings of the commutator 212 corresponding with the numbers of the respective keys. For example, the contact spring 264 corresponding to the seven key of this row of the multiplicand keys is connected by a series of conductors with all the seven contacts of the multiplicand rings of the commutator 212. Also the three key of the units row in the set of multiplicand keys is connected with all of the three contacts of the multiplicand rings of the commutator 212. In a similar manner the contact spring 264 corresponding to each of the keys in the tens row of the set of multiplicand keys except the zero key is connected by a series of conductors with the contacts of the multiplicand rings of the commutator 214 corresponding respectively to the numbers of the keys, and the contact spring 264 corresponding to each of the keys in the hundreds row of said set, except the zero key, is connected by a series of conductors to each of the contacts of the multiplicand rings of the commutator 216 corresponding respectively to the numbers of the keys. For example, the contact spring 264 of the two key of the tens row of the set of multiplier keys is connected by a series of conductors to all of the two contacts of the multiplicand rings of the commutator 214. Also the contact spring 264 of the three key of the hundreds row of said set of multiplicand keys is connected by a series of conductors to all of the three contacts of the multiplicand rings of the commutator 216.

Each of the contact springs 264 corresponding to the several keys in the units row of the set of multiplier keys except the zero key is connected by a series of conductors with the contacts of the multiplier rings of each of the commutators 212, 214 and 216 corresponding respectively to the numbers of the keys. For example, the contact spring 264 corresponding to the four key of the units row of the set of multiplier keys is connected by a series of conductors with all of the four contacts of the multiplier rings of the commutators 212, 214 and 216. Also the contact spring 264 corresponding to the seven key in the units row of said set, is connected by a series of conductors with all of the seven contacts of the multiplier rings of the commutators 212, 214 and 216. In a similar manner the contact springs 264 corresponding to the several keys in the tens row and in the hundreds row of the set of multiplier keys except the zero keys are each connected respectively by a series of conductors with all of the corresponding contacts of the multiplier rings of the commutators 212, 214 and 216. For example, the contact spring 264 of the two key of the tens row of the multiplier keys is connected by a series of conductors with all of the two contacts of the multiplier rings of the commutators 212, 214 and 216. Also the contact spring 264 of the three key in the hundreds row of the multiplier keys is connected by a series of conductors with all of the three contacts of the multiplier rings of said commutators 212, 214 and 216.

These connections between the keyboard switches and the contacts of the commutators are shown diagrammatically in Fig. 20. Fig. 21 indicates the factors represented by the correspondingly located contacts in Fig. 20, and the marginal series of numbers in Fig. 21 indicate respectively the products of the factors in the same radial rows.

As above stated, in multiplying a multiplicand containing three digits by a multiplier containing three digits, in the first cycle, the three digits of the multiplicand are multiplied by the units digit of the multiplier, in the second cycle the three digits of the multiplicand are multiplied by the tens digit of the multiplier and in the third cycle the three digits of the multiplicand are multiplied by the hundreds digit of the multiplier. In the first cycle, referring to Fig. 3, the three trains of the accumulators adjacent the bottom of the figure are employed, in the second cycle the intermediate three trains are used, and in the third cycle the three trains adjacent the top of the figure are employed, except in each case for the transfers which occur during the multiplying operation. This refers to complete trains of accumulators including the toothed wheels 44 and gear wheels 38 and does not include the uppermost partial train shown in Fig. 3 for receiving transfers only. When any train of accumulators is out of operation during a cycle, the corresponding toothed wheel 44 is held stationary by the energization of the corresponding magnet 68.

In order to change the accumulator trains which are in operation during the several cycles of a multiplying operation and to control the circuits for other purposes during the cycles, the three similar cycle commutators 270, 272 and 274 are employed and a fourth cycle commutator 276 is also used. These commutators 270, 272 and 274 all have substantially the same general construction, arrangement and mode of operation of parts and a description of the constructional features of one is believed to be sufficient for all of said commutators. The commutator 270 will, therefore, be described. This commutator comprises a plate 278 of insulating material having its lower portion attached to upwardly extending plates 279 formed on a bracket 280 fixed to the base of the machine to hold the plate in upright position. In the plate are set a series of ten wire holding tubes or ferrules 282 in which are secured the central wires of the conductors 284. Attached to one face of the plate 278 are a series of ten concentric contact rings 286 of conducting material connected with the forward ends of the ferrules 282 as shown in Fig. 2. Outside of the contact rings 286 is a series of arcuate contact conductor plates each extending about the axis of the plate 278 and the concentric rings slightly less than 120 degrees. The contact rings and arcuate contact plates have their centers in the axis of the commutator about which the brush rotates. These contact plates for each commutator are shown diagrammatically in Figs. 24, 25 and 26. As indicated in these figures, the commutator 274 is provided with arcuate peripheral contacts 288, 290 and 292; the commutator 272 with arcuate peripheral contacts 294, 296 and 298 and the commutator 270 with arcuate peripheral contacts 300, 302 and 304.

The commutator 276 is similar in construction to commutators 270, 272 and 274 except for the construction and arrangement of the contact plates, the commutator being provided with a contact ring and a series of arcuate contact plates having their respective centers in the axis of the commutator about which the brush rotates. The commutator 276 comprises a plate 306 of insulating material secured in upright position to a bracket 308 fixed to the base of the machine and having the conductor wires 310 connected thereto in substantially the same manner as the corresponding wires of the other commutators, the commutator 276 being somewhat smaller in diameter than said other commutators. The commutator 276 is provided with a contact ring and a series of arcuate contact plates of conducting material secured to the lateral face of the plate 306 in substantially the same manner that the contact plates and rings of the other commutators are secured to the insulating plates. The construction and arrangement of the contact plates and single ring of the commutator 276 are indicated in Fig. 24. The commutator 276 is provided with a conductor or contact ring 312 located at the inner portion of the commutator and with three arcuate contact plates 314, 316 and 318 located immediately outside of said contact ring, these plates each extending slightly less than 120 degrees about the axis of the commutator. Outside of these contact plates are a second series of contact plates 320 and 322 of which the plate 320 extends slightly less than 120 degrees about the axis of the commutator in substantially the same angular position as the contact plate 314 and the plate 322 extends slightly less than 240 degrees about the axis of the commutator and occupying substantially the same angular position as the two contact plates 316 and 318, taken together. The commutator is provided with a third set of contact plates 324 and 326 located outside the contact plates 320, 322 of which the plate 324 extends slightly less than 240 degrees about the axis of the commutator and is located in substantially the same angular position as the plate 320 and the adjacent half of the plate 322 and the plate 326 extends slightly less than 120 degrees about the axis of the commutator and is located in substantially the same position as the other half of plate 322.

The respective commutators 270, 272, 274 and 276 are provided with brushes indicated respectively at 328, 330, 332 and 334 arranged respectively to sweep over the contact rings and plates of the several commutators during a multiplying operation. Each of these brushes is provided with a series of fingers 336 for engagement with the respective contact rings and plates, the number of fingers on each brush corresponding with the number of contact rings and/or plates of the commutator numbering from the center of the commutator. The fingers of each brush are formed upon a single base plate 338 secured to a brush arm 340, the base plate being interposed between insulating plates 342. Each brush is attached to the corresponding brush arm by means of screws 344 passing through the insulating and base plates and threaded into the brush arm, said screws being insulated from the base plate by any suitable means.

Each of the brush arms 340 is fixed to a shaft 346 mounted in bearings in the bracket 140 and in a second bracket 348 secured to the base of the machine and is driven from the shaft 149 through gearing which will impart a complete rotation to the shaft 346 for every three rotations of the shaft 42. As shown in Figs. 1 and 2, this gearing comprises a gear 350 secured to the gear 144 to rotate therewith on the shaft 146 and a gear 352 fixed to the shaft 346 and meshing with the gear 350. The ratio of the gears 350 and 352 is one to three, so that one revolution is imparted to the gear 352 for each three revolutions of the gear 350.

Figure 20 shows diagrammatically the manner in which the switch of multiplicand key and the switch of a multiplier key are connected with the contacts of one of the multiplying commutators, the commutator 212, for example. As shown in this figure, the switch of the multiplicand key 351 which, in this instance, is the six key, is connected by conductors 353 and 355 with all of the six contacts 357 of the multiplicand rings C of said commutator. In a similar manner, the switch of the multiplier key indicated at 359 is connected by conductors 351 and 363 with all of the four contacts 365 in the multiplier rings D of said commutator.

With the above described commutator construction, all of the contact rings and plates of each of the commutators 270 to 276 inclusive, with which the contact fingers of the corresponding brush are simultaneously engaged will be electrically connected. The brushes of each of the multiplying commutators 212, 214 and 216, through the above described driving connections, are driven through three complete rotations for each complete rotation of each of the brushes of the commutators 270 to 276, inclusive. The brushes of the commutators 212, 214 and 216 are shown diagrammatically in Fig. 24 substantially in the positions which they assume at the beginning of a multiplying operation. During the first cycle of a multiplying operation, the brushes of the multiplying commutators 212, 214 and 216 execute a complete rotation and the brushes of the commutators 270, 272 and 274 execute substantially a third of a rotation and the latter brushes engage respectively the contact plates 300, 294 and 288 for the greater part of the cycle. During the second cycle of operations, the brushes of the multiplying commutators execute a second complete rotation and the brushes of the commutators 270, 272 and 274 execute another third of a rotation and during this cycle said brushes engage the contact plates 302, 296 and 290, respectively. During the third cycle of operations, the brushes of the multiplying commutators execute a third complete rotation and the brushes of the commutators 270, 272 and 274 execute another third of a rotation during which said brushes engage respectively the contact plates 304, 298 and 292.

During the first cycle in a multiplication, the brush of the cycle commutator 276 engages the contact plates 320 and 314, during the second cycle said brush engages the contact plate 316 and during the third cycle the brush engages the contact plates 326 and 318. During the first and second cycles the brush of the commutator 276 is engaged with the contact plate 324 and during the second and third cycles said brush is engaged with the contact plate 322. The brush is, of course, engaged with the contact ring 312 of this commutator throughout the three cycles. The points at which the spaces or gaps occur between the arcuate contact plates having the same radii indicate the points, in the rotation of the respective brushes of the commutators, at which the brushes are out of engagement with said contact plates. In the present construction this occurs at the end of each third of a rotation of the brushes.

The contacts of the respective multiplicand and multiplier keys, except for the zero keys are connected with the multiplicand and multiplier contacts of the multiplying commutators so that upon the depression of the multiplicand and multiplier keys two points in each circuit required for a multiplication to produce a partial product will be connected by the corresponding keys. Then upon rotating the brushes of the multiplying commutators, the circuit required for each multiplication to produce a partial product will be completed by the brush of a commutator.

Certain parts of the construction for connecting the multiplying commutators with the switches of the keys of the keyboard are shown in Figs. 1 and 2. As shown in these figures, the construction comprises a series of multiplicand circuit connecting conductor bars 354 spaced from each other and secured to upright supporting bars 356 fixed to a bracket 358 attached to the base plate 221, insulating bars 359 being interposed between said conductor bars and said supporting bars. These bars are numbered from 0' to 9' consecutively to indicate the respective contacts of the multiplying commutators with which they correspond. There are three sets of these bars indicated respectively at 360, 362 and 364, (see Fig. 2) of which the bars of the set 360 are connected with the corresponding multiplicand contacts of the commutator 212, the bars of the set 362 are connected with the corresponding multiplicand contacts of the commutator 214 and the bars for the set 364 are connected with the multiplicand contacts of the commutator 216. For example, the 6' bar 354 of the set 360 is connected by suitable conductors such as 366 with all of the six contacts in the multiplicand rings of the commutator 212. The 3' bar of the set 360 is connected by suitable conductors such as conductor 365 with all of the three contacts in the multiplicand rings of the commutator 212. The 2' bar of the set 362 is connected by suitable conductors such as 367 with all of the two contacts in the multiplicand rings of the commutator 214. The 9' bar of the set 364 is connected by suitable conductors such as the conductor 373 with all of the nine contacts in the multiplicand rings of the commutator 216. It will be noted that each of the bars is provided with nine openings for the connection of the conductor wires.

The conductor bars 354 of each set are connected respectively with contact springs 264 of the switches of the corresponding keys of the corresponding row of the multiplicand keys. For example, the 6' bar of the set 360 is connected as by a conductor 368 with the contact spring 264 of the six key of the units row of multiplicand keys. In a similar manner, the 2' bar of the set 362 is connected by a suitable conductor 369 with the corresponding contact spring 264 of the switch of the three key of the tens row of the multiplicand keyboard. The 3' bar of the set 364 is connected by a conductor 371 with the contact springs 264 of the switch of the three key of the hundreds row of the multiplicand keys.

The 0' bar 354 of each set is connected by a conductor with the contact spring 265 of the zero key in the corresponding row of multiplicand keys. To each 0' bar is also connected a second conductor forming part of a circuit for each zero key as indicated diagrammatically in Fig. 24.

The electrical connections for the multiplier keys comprise a series of sets 368, 370 and 372 of spaced conductor bars 374 constructed and arranged in a manner similar to the multiplicand bars 354 and located on the opposite side of the multiplying commutators. These bars 374 are mounted on upright supporting bars 376 secured at their lower ends to brackets 378 fixed to the base plate 221, insulating bars 380 being interposed between the conductor bars 374 and said supporting bars.

The conductor bars 374 are indicated in Fig. 1 as numbered consecutively from 0'' to 9'', these numbers, except for the 0'', corresponding to the numbers of the contacts of the multiplying commutator with which they are connected. The corresponding conductor bars of the several sets are connected across the sets by a bus bar. For example, the 9'' bars of the three sets are connected across the sets by a bus bar 382. The 8'' bars, 7'' bars and so on of the three sets are all connected in a similar manner by bus bars.

Each of the bars 374 of the several sets 368, 370 and 372 except the 0'' bars are connected by suitable conductors with the corresponding contacts of the corresponding multiplying commutator. For example, the 4" bar of the set 368 is connected by a series of conductors, such as 384, with all of the four contacts of the multiplier rings of the commutator 212. In a similar manner the 2" bar of the set 370 is connected by a series of conductors with all of the two contacts of the multiplier rings of the commutator 214, and the 4" bar of the set 372 is connected by a series of conductors with all of the four contacts on the multiplier rings of the commutator 216. Each of the bus bars 382 is connected by suitable conductors, such as 386, with the contact springs 264 of all the corresponding keys of the three rows of the multiplier keys. For example, the bus bar connecting the 3" bars 374 is itself connected by a series of conductors with the contact springs 264 of all of the three keys of the set of multiplier keys. The bus bars respectively connecting the 2" bars and the 4" bars 374 are respectively connected by a series of conductors with the contact springs 264 of the three keys and the four keys of the set of multiplier keys.

Fig. 24 is a general circuit diagram of the entire machine, although all of the circuit connections for the several multiplicand and multiplier keys are not shown. The connections, however, for certain of these keys are shown to illustrate the operation of the system.

One side of the source of current indicated at 388 is connected by a conductor 390 with the contact ring 312 of the cycle commutator 276. The segmental contact plate 314 of this commutator is connected by a conductor 392 with a common conductor 394 to which the contact springs 265 of the switches of each of the multiplier keys in the units row is connected as by a conductor 396. As above stated and as shown diagrammatically in Fig. 20, the contact springs 264 of each of the multiplier switches of the several rows except the zero keys are each connected by suitable conductors with all of the corresponding conductors of the multiplier rings of the three multiplying commutators 212, 214 and 216. For example, the contact spring 264 of the switch of the four key of the units row of the multiplier keys is connected with a conductor 398 which forms a common conductor leading to the four contacts of the multiplier rings of the three commutators 212, 214 and 216. This common conductor is connected by suitable conductors such as the conductors 400, 402 and 404 with all of said four contacts of the three commutators.

The contact springs 265 of each of the multiplicand switches of the several rows of the multiplicand keys except the zero keys are connected respectively with correspondingly numbered contacts of the multiplicand rings of the commutators 212, 214 and 216. For example the contact spring 265 of the six key of the units row of the multiplicand keys is connected as by a conductor 406 with each of the six contacts in the multiplicand rings of the commutator 212. The contact spring 265 of the switch of the two key of the tens row of the multiplicand keys is connected as by conductors such as 408 with all of the two contacts of the multiplicand rings of the commutator 214. The contact spring 265 of the switch of the nine key of the hundreds row of the multiplicand keys is connected by conductors such as 409 with all of the nine contacts of the multiplicand rings of the commutator 216.

The contact springs 264 of the respective switches of the keys of the units row of the multiplicand keys are connected respectively by suitable conductors with the several contact rings 286 of the commutator 274. In a similar manner the contact springs 264 of the switches of the multiplicand keys of the tens and hundreds row are respectively connected by suitable conductors with the corresponding contact rings of the commutators 272 and 270. For example, the contact spring 264 of the six multiplicand key of the units row is connected by a conductor 410 with the six contact ring of the commutator 274. Also the contact spring 264 of the two key of the tens row of the multiplicand keys is connected by a conductor 412 with the two contact ring of the commutator 272. The contact spring 264 of the switch of the nine multiplicand key of the hundreds row is connected by a conductor 413 with the nine contact ring of the commutator 270.

The contact segment plate 288 of the commutator 274 which is in operation during the first cycle is connected by conductors 414 and 416 with a conductor 418 connected with one side of the electro-magnet 68$^a$ of the units accumulator train. The other side of this magnet is connected with a conductor 419 which forms a common to which the other electro-magnets are connected, the conductor 419 being connected with the other side of the source 388 of electrical energy.

The electro-magnets for the several trains of the accumulators beginning with the units accumulator are indicated at 68$^a$, 68$^b$, 68$^c$, 68$^d$ and 68$^e$. One side of each of the several magnets, 68$^b$ to 68$^e$ inclusive is connected respectively to the common conductor 419 by means of conductors 420, 422, 424 and 426.

Th segmental contact plate 294 of the commutator 272 is connected by conductors 428 and 430 with the other side of the magnet 68$^b$. The segmental contact plate 300 of the commutator 270 is connected by conductors 432 and 433 to the other side of the magnet 68$^c$.

The segmental contact plate 320 of the commutator 276 which is in operation during the first cycle of a multiplying operation is connected by conductors 434, 435 with a conductor 436 which in turn is connected with a conductor 438 leading to the other side of the magnet 68$^d$. The segmental contact plate 324 of said commutator which operates during the first and second cycles of a multiplying operation is connected by a conductor 440 with a conductor 442 which leads to the other side of the magnet 68$^e$.

The segmental contact plate 316 of commutator 276 which operates during the second cycle in a multiplying operation is connected by a conductor 444 with a common conductor 446 to which the contact springs 265 of each of the switches of the tens row of the multiplier keys are connected as by conductors 448. The contact springs 264 of the switches of each of these keys are connected with the corresponding contacts of the three multiplying commutators in the manner explained above. For example, the contact spring 264 of the switch of the two key of this row is connected with a conductor 449 which forms a common conductor leading to the two contacts of the multiplier rings of the three commutators 212, 214 and 216. This common conductor is connected by suitable conductors such as the conductors 451, 453 and 455 with the two multiplier contacts of the three commutators.

The segmental contact plate 322 of the commutator 276 which operates during the second and third cycles of the multiplying operation is connected by a conductor 450 with the conductor 416.

The segmental contact plate 290 of the commutator 274 is connected by conductors 452 and 454 with conductor 430 leading to the magnet 68$^b$. The segmental contact plate 296 of the commutator 272 is connected by conductors 456 and 458 with the conductor 433 leading to the magnet 68$^c$. The segmental contact plate 302 of the commutator 270 is connected by a conductor 460 with the conductor 435 which in turn is connected with the magnet 68$^d$ as above described.

The segmental contact plate 326 of the commutator 276 which is engaged by the brush during the third cycle of operations is connected by a conductor 462 with the conductor 454. The segmental contact plate 318 of said commutator which also operates during the third cycle is connected by a conductor 464 with a common conductor 468 to which the contact springs 265 of the respective switches of the multiplier keys of the hundreds row are respectively connected as by conductors 470. The contact springs 264 of the said switches are respectively connected by suitable conductors to correspondingly numbered contacts of the multiplier rings of the three commutators 212, 214 and 216 as above described. For example, the contact spring 264 of the switch of the three key of the hundreds row of the multiplier keys is connected with a conductor 471 which forms a common conductor leading to the three contacts of the multiplier rings of the three commutators 212, 214 and 216. This common conductor is connected by suitable conductors such as 473, 475 and 477 with the three contacts of the three commutators.

The segmental contact plate 292 of the commutator 274 is connected by a conductor 502 with the conductor 458. The segmental contact plate 298 of the commutator 272 is connected by a conductor 504 with the conductor 435. The segmental contact plate 304 of the commutator 270 is connected with the conductor 442.

The switches of the zero keys of the three rows of multiplier keys, in addition to the construction embodied in the other keys of the keyboard, are each provided with two additional spring contact members 472 and 474 (see Fig. 17) located respectively opposite the contact springs 265 and 264 and secured to the base of the switch, these switch members being insulated from the switch members 265 and 264 by insulating plates 476 and 478. When any one of these zero keys is depressed, the engagement of the contact block 262 with the contact springs 265 and 264 spreads these contact springs and engages contacts carried thereby with contacts carried by the contact members 472 and 474.

The contact spring 265 of the zero switch of the units row of the multiplier keys is connected with the common 394. To the contact member 472 of this switch is connected the conductor 418. To the contact member 264 of the switch is connected a conductor 480 leading to the conductor 430 connected with the magnet 68$^b$. To the contact member 474 of said switch is connected a conductor 482 leading to the conductor 433 connected with the magnet 68$^c$.

The contact spring 265 of the zero key of the tens row of the multiplier keys is connected with common 446. The contact member 472 of said switch is connected by a conductor 484 with the conductor 488. The contact spring 264 of said switch is connected with the conductor 482 by a conductor 486. The contact member 474 of said switch is connected with the conductor 436 which leads to the conductor 438 connected with the magnet 68$^d$.

The contact spring 265 of the switch of the zero key of the hundreds row of the multiplier keys is connected with the common 468. The contact members 472, 264 and 474 of said switch are connected respectively with the conductors 488, 490 and 492 which in turn are connected respectively with the conductors 433, 438 and 442 leading to the respective magnets 68$^c$, 68$^d$ and 68$^e$.

The contact spring 265 of the zero key of the units row of the multiplicand keys is connected by a conductor 494 with the conductor 496 which in turn is connected with the conductor 390. The contact spring 264 of said switch is connected by a conductor 498 with the central or zero contact ring of the contact rings 286 of the commutator 274.

The contact spring 265 of the zero key of the tens row of the multiplicand keys is connected with the conductor 496. The contact spring 264 of said switch is connected by a conductor 500 with the zero ring of the contact rings 286 of the commutator 272.

The contact spring 265 of the zero key of the hundreds row of the multiplicand keys is connected by a conductor 502 with the conductor 496. The contact spring 264 of said switch is connected by a conductor 504 with the zero ring of the contact rings 286 of the commutator 270.

Figures 20, 21, 24, 25 and 26 show substantially the positions of the brushes of the several commutators with relation to the brushes engaged thereby at the start of a multiplying cycle.

In illustrating the mode of operation of the mechanism as thus far described, let it be assumed that 926 is multiplied by 324. In the first cycle of operations of the machine in which the brushes of the cycle commutators 270 to 276, inclusive, are given a third of a rotation and the brushes of the commutators 212, 214 and 216 are given a complete rotation, all of the digits in the multiplicand are multiplied by the units digit in the multiplier. In the second cycle of the machine in which the brushes of the commutators 270 to 276, inclusive, are given another third of a rotation and the brushes of the commutators 212, 214 and 216 are given a second complete rotation, all of the digits of the multiplicand are multiplied by the tens digit of the multiplier and during the third cycle of the machine in which the brushes of the commutators 270 to 276 are given still another third of a rotation and the brushes of the commutators 212, 214 and 216 are given a third complete rotation, all of the digits of the multiplicand are multiplied by the hundreds digit of the multiplier. Before starting the machine, of course, the number 926 is set up in the multiplicand keyboard by the depression of the proper multiplicand keys and the number 324 is set up in a corresponding manner in the multiplier keyboard. The starting key 210 is then depressed to throw into operation the one revolution clutch and start the shafts 42 and 346 in rotation.

When the machine is at rest, the pawls 70 are all engaged with the corresponding toothed wheels or disks 44 to hold said wheels and the several trains of the accumulators from rotation. Shortly after the shaft 42 is started, the pawls 70 are all actuated by the bail 82 to disengage the corresponding toothed wheels 44 and to release the accumulator trains of the three lower denominations to the action of the friction drive means. As the pawls 70 are actuated to disengage the same from the toothed wheels 44 of the accumulator trains of the two higher denominations, the corresponding pawls 58 are actuated by the energization of the electro-magnets 68$^d$ and 68$^e$ to engage the same with said wheels before the wheels are disengaged by the pawls 70 to hold the wheels from rotation. The pawls 58 of the two higher denominations are maintained in engagement with the corresponding wheels 44 until the cycle is nearly completed. Just before the completion of a multiplying cycle, the magnets 68$^d$ and 68$^e$ are deenergized and the pawls 58 of the two higher denomination of the accumulator trains are disengaged from the corresponding toothed wheels by the action of the springs 62.

During the first cycle in which the shaft 42 executes its first rotation and the shaft 346 executes its first third of a rotation a circuit may be traced from the source 388 through the conductor 390, the brushes of the commutator 276, the contact segment 314 of said commutator and the conductor 392 to the common 394 of the units row of the multiplier keys. At a predetermined point in the rotation of the brush of the commutator 212 during this cycle, a four contact of a multiplier ring of said commutator is connected by the brush of the commutator with a six contact of a multiplicand ring. When this occurs, a circuit may be traced from the common 394 through the switch of the four key of the units row of the multiplier keys and the conductors 398 and 400 to said four multiplier contact of said commutator. From this four contact the circuit may be traced onward through the brush to said six multiplicand contact of the commutator, thence through the conductor 406 and the switch of the six key of the units row of the multiplicand keys and through the conductor 410 to the six ring of the commutator 274. From this point the circuit may be traced through the brush of the commutator, the contact segment 288, the conductors 414, 416 and 418 to the magnet 68$^a$. From this magnet the circuit may be traced through the conductor 419 to the other side of the source of electrical energy. The energization of the magnet 68$^a$ will arrest the rotation of the toothed wheel 44 of the units train of the accumulators at the point at which twenty-four teeth of the wheel have passed the starting point since the beginning of the multiplying operation. This twenty-four tooth rotation of the toothed wheel 44 will set up a four in the number wheel 2 of the units accumulating train and will cause a transfer of a two to the tens train of the accumulator mechanism.

At another predetermined point in this first cycle, a four contact in a multiplier ring of the commutator 214 will be connected with a two contact in a multiplicand ring of said commutator. When this occurs a circuit is made which may be traced from the switch of the four key of the units row of the multiplier keys through the conductor 398 and the conductor 402 to said four multiplier contact of said commutator. The circuit from this point may be traced through the commutator brush to said two multiplicand contact of said commutator, thence through the conductor 408, the switch of the two key in the tens row of the multiplicand keys and the conductor 412 to the two contact ring 286 of the commutator 272. From this ring the circuit may be traced through the brush of said commutator to the contact segment 294 and the conductors 428 and 430 to the magnet 68$^b$. From the magnet, the circuit may be traced through the conductors 420 and 419 to the other side of the source of electrical energy 388. By the energization of the magnet 68$^b$, which occurs when the toothed wheel 44 of the tens accumulator train has rotated a distance of eight teeth from its starting position, the rotation of the wheel will be arrested. During the rotation of the wheel prior to its being stopped at this point, the indicating wheel 2 of the tens train will be rotated through eight number spaces and the two entered in the tens train during the cycle through the action of the transfer mechanism will be accumulated with this eight, causing the wheel to show a zero and one to be transferred to the hundreds accumulator train through the transfer mechanism.

At a predetermined point in this first cycle of the machine, a four contact in a multiplier ring of the commutator 216 is connected by the commutator brush with a nine contact in a multiplicand ring of said commutator. When this occurs a circuit is made, which may be traced from the switch of the four key of the units row of the multiplier keys through the conductor 398, and the conductor 404 to said four multiplier contact of the commutator 216. From this point the circuit may be traced through the brush to the said nine multiplicand contact of the commutator and thence through the conductor 409 to the switch of the nine key of the hundreds row of the multiplicand keys and thence through the switch and the conductor 413 to the nine contact ring of the commutator 270. From this ring, the circuit may be traced through the brush of the commutator, the contact segment 300 and the conductor 432 to the electro-magnet 68$^c$. From this magnet the circuit may be traced through the conductor 422 and the conductor 419 to the other side of the source of electrical energy.

The energization of the magnet 68$^c$ produced by the closing of the circuit above traced, will cause the arresting of the toothed wheel 44 of the hundreds train of the accumulator when this wheel has rotated a distance of thirty-six teeth from its starting position. During this rotation of the wheel 44 the number wheel 2 of the hundreds train will have been rotated thirty-six number spaces and with the number entered in said train during the rotation of the wheel 44, is accumulated the one received from the transfer mechanism, causing said wheel 2 to register a seven. During this cycle a three is entered in the indicating wheel 2 of the thousands order through the transfer mechanism.

During the first cycle the toothed wheels 44 of the thousands and ten thousands accumulator trains are held stationary and the corresponding number wheels 2 are held stationary except for numbers entered in the number wheel 2 of the thousands train from the hundreds train by the transfer mechanism. To this end the magnets 68$^d$ and 68$^e$ are energized during this cycle.

The circuit for energizing the magnet 68$^d$ during the first cycle may be traced from the contact segment 320 of the cycle commutator 276, which is engaged by the brush during this cycle, through the conductors 434, 435, 436 and 438 to said magnet and from said magnet through the conductors 424 and 419 to the source of electrical energy. The circuit for energizing the magnet 68$^e$ during this cycle may be traced from the contact segment 324 of the cycle commutator through the conductors 440 and 442 to said magnet and from said magnet through the conductors 426 and 419 to the source of electrical energy. In the above operation of the multiplier mechanism, the partial product 3704 is entered in the number wheels of the accumulator during the first cycle.

The toothed wheels 44 of the several accumulator trains are held stationary at the end of the first cycle and until after the beginning of the second cycle, by the holding pawls 70, the electro-magnets 68$^d$ and 68$^e$ having been deenergized to cause the disengagement of the pawls 58 from said wheels of the two higher denominations, and said pawls 70 are all actuated to disengage the wheels shortly after the beginning of the second cycle by the bail 82. The accumulator train of the highest denomination and that of the lowest denomination, however, are not released to the action of the friction drive means at this time. As the pawls 70 are actuated to disengage the toothed wheels 44, the electromagnets 68$^e$ and 68$^a$ are energized to move the corresponding pawls 58 into engagement with the toothed wheels of these denominations before the pawls 70 are disengaged from said wheels. The pawls 58 of these denominations are held in engagement with the corresponding toothed wheels until the cycle is nearly completed when the magnets 68$^e$ and 68$^a$ are deenergized and the corresponding pawls disengaged from the wheels by the springs 62.

In the second cycle of the machine in which the shaft 42 executes its second rotation and the shaft 346 makes its second third of a rotation, each of the digits in the multiplicand is multiplied by the tens digit of the multiplier. In this cycle the partial products are entered in the tens, hundreds and thousands accumulator trains with a transfer from the thousands to the ten thousands accumulator train when required to enter the result. Thus the result, as indicated by the accumulator trains, will be equivalent to the multiplication of 926 by 20.

During the second cycle of the machine, a circuit may be traced from the source of electrical energy through the conductor 390, the contact ring 312 of the commutator 276, the brush of said commutator, the contact segment 316 of the commutator and the conductor 444 to the common conductor 446.

During the second cycle, at a predetermined point in the rotation of the brush of the commutator 212, a two contact of a multiplier ring of this commutator is connected by the commutator brush with a six contact of a multiplicand ring. When this occurs a circuit may be traced from the conductor 446 through the switch of the two key of the tens row of multiplier keys and the conductors 449 and 451 to said two multiplier contact of said commutator. From this two contact, the circuit may be traced onward through the brush to said six multiplicand contact of the commutator and thence through the conductor 406, the switch of the six key of the units row of the multiplicand keys, the conductor 410 to the six ring of the contact rings of the commutator 274. From this point the circuit may be traced through the brush of the commutator and the contact segment 290 which is then engaged by the brush, the conductors 452, 454 and 430 to the magnet 68$^b$. From this magnet the circuit may be traced through the conductors 420 and 419 to the source of electrical energy. The energization of the magnet 68$^b$ will arrest the rotation of the toothed wheel 44 of the tens train of the accumulators at a point at which twelve teeth of the wheel have passed the starting point since the beginning of the cycle. This twelve tooth rotation of the toothed wheel 44 will set up the number two in the number wheel 2 of the tens train, which showed a zero at the end of the first cycle, with the transfer of a one to the hundreds train of the accumulators by the transfer mechanism.

At another predetermined point in the second cycle a two contact in a multiplier ring of the commutator 214 will be connected by the commutator brush with a two contact in a multiplicand ring of said commutator. When this occurs, a circuit is made which may be traced from the conductor 446 through the switch of the two key of the tens row of the multiplier keys and the conductors 449 and 453 to said two multiplier contact of said commutator. The circuit from this point may be traced through the brush to the two multiplicand contact of said commutator and thence through the conductor 408, the switch of the two contact in the tens row of the multiplicand keys and the conductor 412 to the two contact ring 286 of the commutator 272. From this ring the circuit may be traced through the brush of the commutator to the contact segment 296 and thence through the conductors 456, 458 and 433 to the electromagnet 68$^c$. From the magnet the circuit may be traced through the conductors 422 and 419 to the source of electrical energy.

By the energization of the magnet 68$^c$ the toothed wheel 44 of the hundreds accumulator train will be stopped when the toothed wheel has rotated a distance of four teeth from its starting position. During the rotation of the wheel, the corresponding indicating wheel 2 will be rotated through four number spaces. This wheel which showed a seven at the end of the first cycle will be advanced five number spaces during the second cycle and will therefore show a two at the completion of the cycle and a one will be entered in the accumulator of the thousands train through the transfer mechanism.

At another predetermined point in the second cycle of the machine, a two contact in a multiplier ring of the commutator 216 is connected by a commutator brush with a nine contact in a multiplicand ring of said commutator. When this occurs, a circuit is made which may be traced from the conductor 446 through the switch of the two key of the tens row of the multiplier keys and the conductors 449 and 455 to said two multiplier contact. From this point the circuit may be traced through the brush to said nine multiplicand contact of the commutator 216, thence through the conductor 409 to the switch of the nine key of the hundreds row of the multiplicand keys and thence through the conductor 413 to the nine contact ring of the commutator 270. From this ring the circuit may be traced through the brush of the commutator, the contact segment 302 and the conductors 460, 435, 436 and 438 to the electro-magnet 68$^d$. From this magnet the circuit may be traced through the conductors 424 and 419 to the source of electrical energy.

The energization of the magnet 68$^d$, by the closing of the circuit above traced, will cause the arresting of the toothed wheel 44 of the thousands train of accumulators when this wheel has rotated a distance of eighteen teeth from the position which it occupied at the beginning of the cycle. During this rotation of the wheel 44 the number wheel 2 of the thousands train will have rotated eighteen number spaces. This wheel registered a three at the end of the first cycle and receives a one through the transfer mechanism, from the hundreds train, during the second cycle. This wheel will therefore register a two at the completion of the second cycle and the ten thousands train will be actuated through the transfer mechanism to enter a two in said train.

During the second cycle the toothed wheels 44 of the units and ten thousands accumulator trains are held stationary and the corresponding number wheels 2 are held stationary except for numbers entered in the number wheel 2 of the ten thousands train from the thousands train by the transfer mechanism. To this end the magnets 68$^a$ and 68$^e$ are energized during this cycle.

The circuit for energizing the magnet 68$^a$ during the second cycle of the machine may be traced from the contact segment 322 of the cycle commutator 276 through the conductors 450, 416 and 418 to said magnet. From said magnet the circuit may be traced through the conductor 419 to the source of electrical energy. The circuit for energizing the magnet 68$^e$ during the second cycle may be traced from the contact segment 324 of the commutator 276 through the conductors 440 and 442 to said magnet. From said magnet the circuit continues through the conductors 426 and 419 to the source of electrical energy.

In the second cycle the partial product of 18520 obtained by the multiplying mechanism, is added in the accumulators with the partial product 3704 standing in the accumulators at the end of the first cycle so that the accumulators at the end of the second cycle show a total of 22224.

As at the end of the first cycle, the toothed wheels 44 of the several accumulator trains are held stationary at the end of the second cycle and until after the beginning of the third cycle by the holding pawls 70 and said pawls are all actuated by the bail 82 to disengage the wheels shortly after the beginning of the third cycle. This releases the accumulator trains of the three higher denominations to the action of the friction drive means. The accumulator trains of the two lower denominations are not, however, released to the action of the friction drive means by the disengagement of the pawls 70 from the toothed wheels. As the pawls 70 are actuated to disengage the same from the toothed wheels, the pawls 58 corresponding to the two lower denominations are actuated by the energization of the electromagnets 68$^a$ and 68$^b$ to engage the toothed wheels of said denominations before the wheels are released by the pawls 70. The pawls 58 of these two lower denominations are held in engagement with the corresponding toothed wheels until the cycle is nearly completed when the magnets 68$^a$ and 68$^b$ are deenergized and the pawls are disengaged from the wheels by the action of the springs 62.

In the third cycle of the machine in which the shaft 42 executes its third rotation and the shaft 346 executes its third third of a rotation, each of the digits of the multiplicand is multiplied by the hundreds digit of the multiplier. In this cycle the partial products are entered in the hundreds, thousands and ten thousands accumulator trains with a transfer from the ten thousands to the hundred thousands train when required to enter the result. Thus the result as indicated by the accumulator trains, will be equivalent to the multiplication of 926 by 300.

During the third cycle of the machine, a circuit may be traced from the source of electrical energy 388 through the conductor 390 to the ring 312 of the commutator 276 and thence through the brush of the commutator, the contact segment 318 and the conductor 464 to the common conductor 468.

During the third cycle, at a predetermined point in the rotation of the brush of the accumulator 212, a three contact in a multiplier ring of this commutator is connected by the commutator brush with a six contact of a multiplicand ring. When this occurs, a circuit may be traced from the conductor 468 through the switch of the three key of the hundreds row of the multiplier keys and the conductors 471 and 473 to said three contact of said commutator 212. From this three contact, the circuit may be traced onward through the brush to said six multiplicand contact of the commutator, through the conductor 406 and the switch of the six key of the units row of the multiplicand keys, thence through the conductor 410 to the six ring of the contact rings of the commutator 274. From this point the circuit may be traced through the brush of the commutator and the contact segment 292 which is then engaged by the brush, the conductors 502, 458 and 433 to the magnet 68$^c$. From the magnet the circuit continues through the conductors 422 and 419 to the source of electrical energy. The energization of the magnet 68$^c$ will arrest the rotation of the toothed wheel 44 of the hundreds train of the accumulators at a point at which eighteen teeth of the wheel have passed the starting point since the beginning of the cycle. This eighteen tooth rotation of the toothed wheel 44 will set up a zero in the number wheel 2 of the hundreds train of the accumulators which registered a two at the beginning of the cycle with the transfer of a one to the thousands train by the transfer mechanism.

At another predetermined point in the third cycle, a three contact in a multiplier ring of the commutator 214 will be connected with a two contact in a multiplicand ring of said commutator. When this occurs a circuit is made which may be traced from the common conductor 468 through the switch of the three key of the hundreds row of the multiplier keys and the conductors 471 and 475 to said three multiplier contact. From this point the circuit may be traced through the brush of the commutator, said two multiplicand contact of the commutator, the conductor 408, the switch of the two key of the tens row of the multiplicand keys and thence through the conductor 412 to the two ring of the commutator 272. From this ring the circuit continues through the brush of the commutator, the contact segment 298 and the conductors 504, 435, 436 and 438 to the magnet 68$^d$. From this magnet the circuit continues through the conductors 424 and 419 to the source of electrical energy.

The energization of the magnet 68$^d$ by the closing of the above circuit will cause the arresting of the toothed wheel 44 of the thousands train of accumulators when this wheel has rotated a distance of six teeth from the position which is occupied at the beginning of the cycle. During this rotation of the wheel 44, the number wheel 2 of the thousands train will have been rotated six number spaces. This number wheel registered a two at the beginning of the cycle and receives a two through the transfer mechanism during the cycle so that it will register a zero at the end of the third cycle and a one will be transferred through the transfer mechanism to the ten thousands train.

At another predetermined point in the third cycle, a three contact in a multiplier ring of the commutator 216 is connected by the commutator brush with a nine contact in a multiplicand ring of said commutator. When this occurs, a circuit is made which may be traced from the conductor 468 through the switch of the three key of the hundreds row of the multiplier keys and the conductors 471 and 477 to said three multiplier contact of the commutator. From this point the circuit may be traced through the brush of the commutator, thence through the conductor 409 to the switch of the nine key of the hundreds row of the multiplicand keys and from this switch through the conductor 413 to the nine contact ring of the commutator 270. From this ring, the circuit may be traced through the brush of the commutator, the contact segment 304 and the conductor 442 to the electro-magnet 68ᵉ. From this magnet the circuit continues through the conductors 426 and 419 to the source of electrical energy. The energization of the magnet 68ᵉ by the closing of the above circuit will cause the arresting of the toothed wheel 44 of the ten thousands train of accumulators when this wheel has rotated a distance of twenty-seven teeth from the position it occupied at the beginning of the cycle. During this rotation of the wheel 44, the number wheel 2 of the ten thousands train will have been driven a distance of twenty-seven number spaces. This wheel registered a two at the beginning of the cycle and receives a one through the transfer mechanism during the cycle so that it will register a zero at the end of the cycle and a three will be entered in the number wheel of the hundred thousands train through the transfer mechanism. As above stated, just before the completion of the third cycle, the electro-magnets 68ᵃ and 68ᵇ are deenergized and the corresponding pawls 58 are disengaged from the toothed wheels 44. The wheels, however, are held from rotation until the stoppage of the machine at the completion of the cycle and the multiplying operation by the corresponding pawls 70.

The above explains the operation of the multiplying mechanism except in cases in which zeros occur in the multiplicand or multiplier, or in which there are no digits in the tens and hundreds places. When a zero occurs in the units place of the multiplier, circuits are made during the first cycle which may be traced from the common 394 through the switch of the zero key of the units row of the multiplier keys, the conductors 418, 480 and 482, the magnets 68ᵃ, 68ᵇ and 68ᶜ and from the magnets to the source of electrical energy through the circuit connections above described. In a similar manner, when the zero occurs in tens place in the multiplier the magnets 68ᵇ, 68ᶜ and 68ᵈ are energized during the second cycle by the circuits from the common 446 through the switch of the zero key of the tens row of the multiplier keys which is then depressed and the conductors 484, 486 and 436.

When there is no digit in hundreds place of the multiplier, the multiplication is made as if there were a zero in this place, the zero key being depressed. The magnets 68ᶜ, 68ᵈ and 68ᵉ are then energized during the third cycle by circuits from the common 468 through the switch of the zero key of the hundreds row of the multiplier keys and the conductors 488, 490 and 492.

When there are no digits in tens and hundreds places of the multiplier, the multiplication is performed as if there were zeros in these places, the corresponding zero keys being depressed. Thus the magnets 68ᵇ, 68ᶜ and 68ᵈ are energized during the second cycle by the closing of circuits through the switches of these keys and the magnets 68ᶜ, 68ᵈ and 68ᵉ are energized during the third cycle. The toothed wheels 44 of the tens, hundreds and thousands trains are thus held stationary during the second cycle and said wheels 44 of the hundreds, thousands and ten thousands trains are held stationary during the third cycle.

When a zero occurs in units place of the multiplicand, a circuit is made from the source of electrical energy through the conductors 390, 496 and 494 to the switch of the zero key in the units row of the multiplicand and thence through the conductor 498 to the zero ring of the contact rings 276 of the commutator 274. The circuits made during the several cycles from the contact rings of the commutator through the magnets 68ᵃ, 68ᵇ and 68ᶜ have been described above. Thus the toothed wheels 44 of the units, tens and hundreds accumulator trains are held stationary respectively during the first, second and third cycles.

When a zero occurs in tens place in the multiplicand, a circuit is made which may be traced from the source 388 through the conductors 390 and 496 to the switch of the zero key of the tens row of the multiplier keys and from said switch through the conductor 500 to the zero ring of the commutator 272. The circuits made during the several cycles from the contact rings of this commutator through the magnets 68ᵇ, 68ᶜ and 68ᵈ have been described above. Thus the toothed wheels 44 of the tens, hundreds and thousands accumulator trains are held stationary respectively during the first, second and third cycles.

When there is no digit in the hundreds place of the multiplicand, a multiplication is made as if there were a zero in this place, the zero key being held depressed during the multiplication. In this case a circuit may be traced during each cycle from the source 388 through the conductors 390, 496 and 502 to the zero switch of the hundreds row of the multiplicand keys and thence through the conductor 504 to the zero ring of the commutator 270. The circuits made during the several cycles, from the contact rings of the commutator, through the magnets 68ᶜ, 68ᵈ and 68ᵉ have been described above. Thus the toothed wheels 44 of the hundreds, thousands and ten thousands trains are held stationary respectively during the first, second and third cycles.

When there are no digits in tens and hundreds places of the multiplicand, the multiplication is performed as if there were zeros in these places, the corresponding zero keys being depressed. Thus the magnets 68ᵇ and 68ᶜ are energized during the first cycle, the magnets 68ᶜ and 68ᵈ during the second cycle and the magnets 68ᵈ and 68ᵉ during the third cycle by the closing of circuits through the switches of these keys, thereby holding the toothed wheels of the tens and hundreds trains, the hundreds and thousands trains, and the thousands and ten thousands trains stationary respectively during these cycles.

As an example of the multiplication of the multiplicand by a multiplier containing a zero in units place, suppose 926 is multiplied by twenty. In the first cycle, the magnets 68ᵃ, 68ᵇ and 68ᶜ are all energized through the circuits above described made through the switch of the zero key of the units row of the multiplier keys and the units, tens and hundreds accumulator trains are therefore held stationary. In the second cycle, the multiplication of 926 by two is performed in the same manner as above described in describing the multiplication of 926 by 324. In the third cycle the magnets 68$^c$, 68$^d$ and 68$^e$ are all energized by the circuits above described made through the switch of the zero key of the hundreds row of the multiplier keys which is then depressed, and the hundreds, thousands and ten thousands accumulator trains are all held stationary.

In multiplying 926 by 300, during the first cycle the magnets 68$^a$, 68$^b$ and 68$^c$ are all energized by the closing of the circuits through the switch of the zero key of the units row of the multiplier keys and the units, tens and hundreds accumulator trains are all held stationary. During the second cycle, the magnets 68$^b$, 68$^c$ and 68$^d$ are all energized by the closing of the circuits through the switch of the zero key of the tens row of the multiplier keys and the tens, hundreds and thousands accumulator trains are held stationary. In the third cycle the multiplication of 926 by three is performed in the same manner as above described in describing the multiplication of 926 by 324.

In the multiplication of 920 by four, the magnet 68$^a$ is energized during the first cycle by the closing of the circuit above described through the switch of the zero key in the units row of the multiplicand keys. The remainder of the multiplication during the first cycle is performed in the same manner as in the first cycle of the multiplication of 926 by 324. During the second and third cycles the accumulator trains are all held stationary as will be readily understood without further explanation. In the multiplication of 906 by four, the multiplication of six by four is performed as above described in describing the first multiplication. During the first cycle, the electro-magnet 68$^b$ is energized by the closing of the circuit through the switch of the zero key in tens place of the multiplicand keys and the toothed wheel 44 of the tens accumulator train is held stationary during this cycle. The multiplication of nine by four is performed in the same manner as in the first multiplication above described.

The zero keys are all depressed after the completion of a multiplying operation, except, of course, those that are then in depressed position. In the present machine, the greatest rotation of any of the toothed wheels 44 which is required during the third cycle to complete the multiplication is eighty-one teeth or eighty-one hundredths of a rotation. The zero keys are depressed during the interval in the third cycle after the shaft 149 has executed the rotation required for the completion of the multiplying operation and before said shaft has completed its one revolution.

The sets of multiplier and multiplicand keys are provided with separate automatic mechanisms for simultaneously depressing the zero keys of the set after the completion of a multiplying operation. The depression of the zero keys releases the depressed significant figure keys in each row of the keyboard, thereby clearing the keyboard. Either of these mechanisms may be rendered inoperative at the will of the operator independently of the other mechanism. This eliminates clearing of the multiplicand or multiplier keys and enables the same multiplicand or the same multiplier keys to be retained in depressed positions for several multiplying operations when desired. The zero keys of either set of keys also may be simultaneously depressed by hand.

The set of multiplicand keys is provided with a mechanism for depressing the zero keys comprising a lever indicated as a whole at 506 and provided with spaced parallel side plates 508 and a cross plate 510 connecting said side plates (see Figs. 16 and 17). The lever is pivoted by means of studs 512 to the downwardly projecting arms 514 formed on the guide plate 246. The forward edge of the cross plate 510 is arranged to engage in the slots 516 formed in each of the zero key bars, said plate being located adjacent the shoulder forming the lower end wall of each slot when both the key bars and the operating lever 506 are in their normal elevated positions. This construction enables the key bars to be individually depressed independently of the lever 506. To depress the zero key bars simultaneously, the lever 506 is swung downwardly from its normal elevated position.

To enable said lever to be swung downwardly by hand, the side plate on the left hand side of the lever (Fig. 14) is extended forwardly and a key bar 518 having a key 520 is formed on said extension.

The automatic mechanism for depressing the lever 506 comprises a lever 522 (see Fig. 13) pivoted at 524 on a bracket 526 secured to and extending upwardly from the base plate 258 and a link 528 connecting the rear end of the lever with the adjacent side plate 508 of the lever 506. The lever 522 is acted upon by a coiled spring 530 which normally maintains the rear end of said lever and the lever 506 in elevated position. The lever 522 extends over and forms the armature of an electro-magnet 532 supported on the base plate 258.

The mechanism for simultaneously depressing the zero keys of the multiplier set have substantially the same construction and mode of operation as that above described except that certain of the parts are reversed in positions. The reference numerals 506$^a$ to 522$^a$ are applied to corresponding parts of this mechanism.

The electro-magnets 532 and 532$^a$ are located in parallel circuits connected with the source 388 (see Fig. 22). The machine is provided with mechanism for closing the circuits through these magnets during the rotation of the shaft 149 after the completion of a multiplying operation.

Fig. 22 illustrates the circuit diagram for the electro-magnets 532 and 532$^a$. As shown in this figure, the source of electricity 388 is connected by a conductor 536 with a conductor 538 leading to one side of the electromagnet 532. The other side of the magnet is connected by a conductor 540 with a spring plate 542 supported between blocks or plates of insulation 544 attached to a bracket 545 secured to the frame of the keyboard, said spring plate forming part of a switch for controlling the circuit of the magnet 532. Upon the spring plate 542 is mounted a contact 546 arranged to engage an opposed contact 548 mounted on a spring plate 550 supported between insulation blocks 544 and forming a part of said switch. The resilience of the spring plate 550 normally holds the switch contact 548 out of engagement with the switch contact 546. The engagement of the switch contacts is controlled by a manually adjustable lever 552 pivoted on a stud 554 secured in a U-shaped bracket 556 attached to the under side of the guide plate 246 (see Fig. 17). The lever 552 is provided with a contact portion or facing 558 made of insulating material and arranged to engage the spring plate 550. This contact portion is formed with a substantially flat contact face 560 and with an arcuate contact face 562 conforming to an arc struck from the axis of the lever and having a radius greater than the perpendicular distance from the axis of the lever to the contact face 560. When the lever 552 is in the position shown in Fig. 18, the flat contact face 560 is engaged with the spring plate 550 and the switch contacts are held relatively open or disengaged by the resilience of said spring plate. In closing the switch contacts, the lever 552 is swung from the position shown in Fig. 18 in a counter-clockwise direction to the position shown in Fig. 19. This movement of the lever forces the spring plate 550 carrying the contact 548 to the right to engage said contact with the contact 546 thereby partially closing the circuit of the magnet 532. In opening the switch, the lever 552 is, of course, swung in the reverse direction. The lever engages in a slot in the cover plate 246 of the keyboard and the movement of the lever in a clockwise direction is limited by the engagement of the lever with the forward end of the slot. The movement of the lever in a counter-clockwise direction is limited by the engagement of the forwardly extending arm thereof with the under side of the cover plate, as shown in Fig. 19.

The spring plate 550 is connected by a conductor 564 with a conductor 566. As stated above, magnet 532ª is connected in parallel relation to the magnet 532. The conductor 536 is connected by a conductor 538ª with one side of the magnet 532ª the other side of which is connected by a conductor 540ª with a manually controlled switch having substantially the same construction as the switch connecting the conductors 540 and 564 and the corresponding parts of which switch are indicated by the corresponding reference numerals 542ª to 550ª. The leaf spring 550ª is connected with conductor 566 by a conductor 564ª.

The conductor 566 is connected with a spring plate 568 forming part of an automatic switch supported on the frame of the machine adjacent the inner end of the shaft 149 and arranged to be closed after the completion of each multiplying operation and before said shaft completes its one revolution (see Figs. 11 and 12). The spring plate 568 is mounted between blocks or plates of insulating material 570 and 572 secured to a bracket 574 attached to the frame of the machine and carries a contact 576 arranged to engage a contact 578 carried at the outer end of a spring plate 580 mounted between the insulating plate 572 and an insulating plate 582, the insulating plates and spring plates being attached together and to said bracket by suitable screws 583. The spring plate 580 normally holds the contact 578 out of engagement with the contact 576. The spring plate 580 is bent downwardly to engage said contacts by means of an actuating arm 584 attached by a screw 586 to the inner end of the shaft 149 and arranged to engage a plate 588 of insulating material fixed to the spring plate 580. The actuating arm 584 is adjustably pivoted on the screw 586, and is held in adjusted angular position by means of a screw 590 passing through a slot 592 in said arm and threaded into the gear 148. The spring plate 580 of the switch is connected by a conductor 594 with the source 388 of electrical energy.

With this construction, during the latter part of the single revolution imparted to the shaft 149 to effect a multiplying operation and after the multiplying operation is completed, the end of the arm 584 engages the plate 588 and swings the spring plate 580 downwardly to engage the contact 578 with the contact 576 to close the circuits of the magnets 532 and 532ª. The time, in the rotation of the shaft 149, at which the switch is actuated to close the circuit may be regulated by adjusting the arm 584 angularly with relation to the shaft 149.

The arm 584 may occupy substantially the position shown in Fig. 11 when the shaft 149 is stopped at the end of a single revolution, the arm being shown in this figure in the position which it assumes after having passed the contact plate 588 allowing the spring plate 580 to swing upwardly and open the switch contacts.

The connection of the multiplicand and multiplier contacts of a commutator with opposite sides or terminals of the source of electrical energy is referred to in certain instances in the application as rendering the contacts potentially active since the bridging of the contacts when connected in this manner with the source will result in the flow of current through circuits including said contacts.

Figure 29 is a diagrammatic view illustrating the timing of various parts of the machine in the multiplication of the multiplicand 906 by the multiplier 304. This diagram shows the timing of the several parts of the mechanisms except for the entering of amounts carried over by the transfer mechanisms. Upon the depression of the starting key 211, the one revolution clutch for driving the shaft 149 is tripped and the shaft 346 and the shaft 42 are started in rotation. During a complete multiplying operation, the shaft 346 is rotated through a complete revolution from its position when the parts of the machine are in normal or idle positions and the shaft 42 is rotated through three complete revolutions during the multiplying operation. In the timing diagram, the vertical line 600 indicates the point at which shafts 346 and 42 begin their rotary movement and also the point at which the brushes of the commutators 212, 214, 216, 270, 272, 274, and 276 begin their rotary movement.

When the shaft 42, in its rotation, reaches the point indicated at 602, the holding pawls 70 are actuated to disengage the toothed wheels 44 for each denomination of the accumulator mechanism.

At the same point in the cycle, as indicated at 604, the brush of the commutator 276 engages the contact plate 314 to connect the source of electrical energy with the units switches of the multiplier keyboard. Also at this point in the cycle of the mechanism, the brush of commutator 276 engages the contact plate 320 to energize the electro-magnet 68ᵈ to throw in the stop pawl 58. Still further, at this point 604 the brush of the commutator 276 engages the contact plate 324 to energize the electro-magnet 68ᵉ to throw in the stop pawl 58 for ten-thousands place of the accumulator.

At this same point in the operation of the mechanism as indicated at 606, the brush of commutator 270 engages the contact plate 300 to render potentially active the "9" multiplicand contacts of the commutator 216. Also at this point in the action of the mechanism as indicated at 608, the brush of commutator 272 engages the contact plate 294 to energize the electro-magnet 68ᵇ through the "0" key switch of tens place of the multiplicand keyboard. The brush of commutator 274, also at this same point in the operation of the mechanism as indicated at 610, engages the contact plate 288 to render potentially active the "6" multiplicand contacts of the commutator 212. As indicated toward the bottom of the timing diagram, the units train of the accumulator and the hundreds train thereof are started in rotation at this same point in the first cycle as indicated at 612 and 614 respectively.

At the point in the first multiplying cycle indicated at 616 in the diagram, the brush of the commutator 212 connects a "4" multiplier contact of said commutator with a "6" multiplicand contact, thereby energizing electro-magnet 68ª and throwing the stop pawl 58 and the holding pawl 70 into engagement with the toothed wheel 44 of the units train of the accumulator. The electro-magnet 68ª is almost immediately deenergized by the disconnection of said contacts and the pawl 58 is disengaged from the toothed wheel. The wheel, however, is held from further rotation during the cycle by the holding pawl 70. This sets up the product 24 in the units and tens places of the accumulator.

At the point 618 in the operation of the mechanism, the brush of commutator 216 connects a "4" multiplier contact of said commutator with a "9" multiplicand contact thereby energizing the electro-magnet 68ᶜ and throwing the stop pawl 58 and the holding pawl 70 into engagement with the toothed wheel 44 of hundreds place of the accumulator. The electro-magnet is almost immediately thereafter deenergized and the stop pawl is thrown out, but the toothed wheel is held from further rotation during the cycle by the holding pawl 70. The product 36 is thereby set up in hundreds and thousands place of the accumulator.

Since the electro-magnet 68ᵇ was energized at the point 608 in the rotation of commutator 272, and remains energized until the cycle is nearly completed, the toothed wheel 44 of tens place of the accumulator and the corresponding train of the accumulator will not be actuated except for transfers from the units train.

Thus the operation of the units train of the accumulator will be arrested at the point 620 in the cycle and the hundreds train of the accumulator will be arrested at point 622.

At the point indicated at 624 in the first cycle, the brush of the commutator 276 disengages the contact plate 320 to de-energize the magnet 68ᵈ. Also at this point 624, the brush of the commutator 276 disengages the contact plate 314 to disconnect the source of electrical energy from the multiplier keyboard. The brush of this commutator, however, continues to be engaged with the contact plate 324 from the beginning of the first cycle throughout the second cycle to hold the electro-magnet 68ᵉ energized.

At this same point in the cycle as indicated at 626, the brush of commutator 270 disengages the contact plate 300. Also at this same point in the cycle as indicated at 628, the brush of commutator 272 disengages the contact plate 294 to de-energize the magnet 68ᵇ. The brush of commutator 274 disengages the contact plate 288 at this same point in the cycle as indicated at 630.

The cycle is completed when the shaft 346 has executed an angular movement of 120° from its starting position and the shaft 42 has executed a complete rotation from its starting position.

At the beginning of the next cycle, the holding pawls 70, for each denomination of the commutator, are disengaged from the corresponding toothed wheels at the point in the operation of the machine indicated at 632.

The brush of commutator 276 engages the contact plate 322 to energize the electro-magnet 68ª at this same point in the operation of the machine. Also at this same point in the operation of the machine, as indicated at 635, the brush of commutator 276 engages the contact plate 316 to connect the source of electrical energy with the "0" switch of the tens order of the multiplier keyboard and thereby energize electro-magnets 68ᵇ, 68ᶜ, and 68ᵈ. The electro-magnet 68ᵉ is energized throughout the second cycle by the continued engagement of the brush of commutator 276 with the contact plate 324.

At this same point in the cycle of the machine, the brush of commutator 270 engages the contact plate 302, the brush of commutator 272 engages the contact plate 296, and the brush of commutator 274 engages the contact plate 290, as indicated respectively at 636, 638, and 640, but these operations do not enter into the multiplication during this cycle.

By the action of the commutator 276, the electro-magnets 68ª to 68ᵈ, inclusive, are held energized to hold the stop pawls 58 and holding pawls 70 in engagement with the corresponding toothed wheels until a point in the operation of the mechanism adjacent the end of the second cycle. The accumulator trains of all of the several denominations of the accumulator are therefore held out of operation during this period.

At the point indicated at 634, the brush of commutator 276 disengages the contact plate 316 to disconnect the source of electrical energy from the "0" switch of the multiplier keyboard and the electro-magnets 68ᵇ, 68ᶜ, and 68ᵈ will thereby be de-energized. At this same point in the cycle, the brush of commutator 276 disengages the contact plate 324 to deenergize the electro-magnet 68ᵉ. The brush of the commutator 276 remains in engagement with the contact plate 322 and holds the electro-magnet 68ª energized until a point is reached in the operation of the machine adjacent the end of the third cycle.

At the same point in the cycle as the point 634 and indicated respectively at 642, 644, and 646, the brushes of commutators 270, 272, and 274 are disengaged from the respective contact plates 302, 296, and 290.

The second cycle is completed when the shaft 346 has executed an angular movement of 240° from its starting position, and the shaft 42 has completed a second rotation from its starting position.

At the point indicated at 648 at the beginning of the third cycle of the mechanism, the holding pawls 70, for the trains of the accumulator of the several denominations, are all disengaged from the toothed wheels 44.

At this same point in the cycle of the mechanism indicated at 650, the brush of commutator 276 engages contact plate 326 to energize the electro-magnet 68ᵇ. The brush of commutator 276 engages the contact plate 318 also at this same point in the cycle of the mechanism to connect the source of electrical energy with the hundreds order switches of the multiplier keyboard. As indicated above, the brush of commutator 276, at this time, is engaged with the contact plate 322 to maintain the electro-magnet 68ª energized.

At this same point in the operation of the mechanism as indicated at 652, the brush of commutator 270 engages the contact plate 304 to render potentially active the "9" multiplicand contacts of the commutator 216. The brush of commutator 272 engages the contact plate 298 also at this same point in the operation of the mechanism as indicated at 654 to energize the electromagnet 68ᵈ through the "0" switch of hundreds order of the multiplicand keyboard. Also at this same point in the operation of the mechanism as indicated at 656, the brush of commutator 274 engages the contact plate 292 to render potentially active the "6" multiplicand contacts of the commutator 212.

At the point indicated at 658 in the third cycle of the machine, a "3" multiplier contact of the commutator 212 is connected with a "6" multiplicand contact of said commutator by the brush of the commutator and the corresponding pawls 58 and 70 are engaged with the toothed wheel 44 of the hundreds train of the accumulator to arrest the rotation thereof and hold the same from rotation during the remainder of the cycle. During the operation of said train, the product 18 is entered in the hundreds and thousands trains.

Because of the energization of the magnet 68ᵈ, the corresponding thousands train of the accumulator is held from movement by the stop and holding pawls except for transfers, during the third cycle of the machine.

At the point indicated at 660 in the third cycle of the mechanism, a "3" multiplier contact of the commutator 216 is connected with a "9" contact of said commutator by the brush of the commutator and the corresponding pawls 58 and 70 are engaged with the toothed wheel of the ten-thousands train of the accumulator to arrest the rotation of said train and to hold the same from rotation during the remainder of the cycle. During the operation of said train, the product 27 is entered in the ten-thousands and hundred-thousands trains of the accumulator.

Thus, during the third cycle of the mechanism, the hundreds train of the accumulator is operated from the point indicated at 662 to the point indicated at 664. Also during this cycle, the ten-thousands train of the accumulator is operated from the point 666 in the cycle to the point 668.

At the point in the third cycle indicated at 678, the zero keys of both the multiplicand and multiplier keyboards are automatically depressed, thereby clearing the keyboards.

At the point in the third cycle indicated at 670, the brush of the commutator 276 disengages the contact plate 318 to disconnect the multiplier keyboard from the source of electrical energy. At this same point in the third cycle of the mechanism the brush of the commutator 276 disengages the contact plate 322 to deenergize the electro-magnet 68ᵃ. The brush of the commutator 276 disengages the contact plate 326 also at this same point in the cycle to deenergize the electro-magnet 68ᵇ.

At this same point in the cycle as indicated respectively at 672, 674, and 676, the brush of commutator 270 disengages the contact plate 304, the brush of commutator 272 disengages the contact plate 298 and the brush of commutator 274 disengages the contact plate 292.

At the end of the third cycle when the shaft 346 has executed a complete rotation from its starting position and the shaft 42 has executed three complete rotations from its starting position during the multiplying operation, the holding pawls 70 are all engaged with corresponding toothed wheels 44 of the commutator mechanism and the stop pawls 58 are disengaged from said wheels, the corresponding electro-magnets being then deenergized. At the completion of the multiplying operation the one revolution clutch is disengaged to stop the machine.

It is to be understood that, except as defined in the claims, the invention is not limited to the particular construction and arrangement of parts of the illustrated embodiment of the invention but that the invention may be embodied in other forms within the scope of the claims.

Having explained the nature and object of the invention and having illustrated and described a construction embodying the invention in its preferred form, what is claimed is:

1. In a multiplying machine having a commutator provided with a set of multiplicand and a set of multiplier contacts located on the commutator to represent the products of digits indicated by correspondingly located contacts, a series of multiplicand keys arranged in orders corresponding to the orders in the multiplicand for selectively rendering potentially active one or more multiplicand contacts of the commutator, a series of multiplier keys arranged in orders to represent the orders of the multiplier for selectively rendering potentially active one or more multiplier contacts of the commutator, the commutator having bridging means for bridging across potentially active multiplicand and multiplier contacts, means for moving relatively the contacts and the bridging means, an accumulator comprising a series of trains, and mechanism comprising electro-magnets controlled by the bridging of potentially active contacts for differentially controlling certain of said accumulator trains during each cycle, the combination of cyclically actuated and controlled means for engaging contacts corresponding to zero keys in each order respectively of the multiplicand and multiplier keys at the end of each multiplying operation, said contacts remaining engaged in all orders where no keys are depressed in setting up the keyboard for a multiplication, circuits for said electro-magnets connected respectively with the latter contacts, and commutator mechanism for completing said circuits and energizing said electro-magnets for preventing the operation, during each cycle, of accumulator trains corresponding to the orders in which the keys are not thus depressed.

2. In a multiplying machine having a commutator comprising a set of multiplicand contacts and a set of multiplier contacts located to represent the products of correspondingly located contacts, means including factor entry instrumentalities for selectively rendering potentially active one or more multiplicand contacts and one or more multiplier contacts representing factors to be multiplied, the commutator having a bridging mechanism for bridging across the potentially active multiplicand and multiplier contacts, means for moving relatively the contacts and the bridging mechanism to connect correspondingly located and potentially active multiplicand and multiplier contacts, and an accumulator moving to correspond with the relative movement of the contacts and the bridging means and comprising a series of accumulator trains; friction drive means for operating the trains of the accumulator, devices for stopping positively said accumulator trains and holding the same against the action of said friction drive means, mechanism for actuating all of said devices to release certain of said accumulator trains to the action of the corresopnding friction drive means to start a multiplying operation, means controlled by the commutator and including electro-magnets for operating the devices of individual trains to stop said accumulator trains differentially in the course of multiplication when potentially active contacts are bridged by the commutator, and thereafter to hold said trains against actuation until the completion of a cycle, and a further commutator, circuits controlled by said last commutator and responsive to the setting of the factor entry instrumentalities to energize certain of said electro-magnets at the beginning of a multiplication to prevent actuation of those trains wherein no entries are required, whereby accumulator trains may be rendered inactive through said last commutator even though they are released by said release mechanism.

3. In a multiplying machine having a commutator comprising a set of multiplicand contacts and a set of multiplier contacts located to represent the products of the factors represented by correspondingly located contacts, means including factor entry instrumentalities for selectively rendering potentially active one or more multiplicand contacts and one or more multiplier contacts representing factors to be multiplied, the commutator having a bridging mechanism for bridging across the potentially active multiplicand and multiplier contacts, means for moving relatively the contacts and the bridging mechanism to connect correspondingly located and potentially active multiplicand and multiplier contacts, and an accumulator comprising two or more trains and arranged to operate in timed relation to the relative movement of the contacts and the bridging means; friction drive means for operating accumulator trains, devices for positively stopping and holding the respective trains of the accumulator stationary against the action of said friction drive means, mechanism for actuating all of said devices to release certain of said trains at the beginning of a multiplying cycle of the machine, mechanism controlled by said commutator and comprising electro-magnets for selectively actuating said devices to stop differentially said accumulator trains against the action of said friction drive means upon the bridging of potentially active multiplcand and multiplier contacts, and further means for causing the actuation of said devices to hold positively trains of the accumulator stationary against the action of said drive means throughout a cycle in multiplying factors containing zero digits, said last means comprising a commutator and circuits controlled by said commutator and by the factor entry instrumentalities for energizing certain of said electro-magnets.

SAMUEL A. NEIDICH.